United States Patent
Oh et al.

(10) Patent No.: US 9,422,477 B2
(45) Date of Patent: Aug. 23, 2016

(54) LIQUID CRYSTAL COMPOSITON AND LIQUID CRYSTAL DISPLAY INCLUDING THE SAME

(71) Applicant: Samsung Display Co., Ltd., Yongin (KR)

(72) Inventors: Keun Chan Oh, Cheonan-si (KR); Ji Hong Bae, Yongin-si (KR); Kyung Min Kim, Seoul (KR); Sun Young Kwon, Seoul (KR); Jun Hyeok Bang, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/706,700

(22) Filed: May 7, 2015

(65) Prior Publication Data

US 2016/0122645 A1    May 5, 2016

(30) Foreign Application Priority Data

Oct. 29, 2014  (KR) .................. 10-2014-0148234

(51) Int. Cl.
| | | |
|---|---|---|
| G02F 1/1343 | (2006.01) | |
| C09K 19/34 | (2006.01) | |
| C09K 19/56 | (2006.01) | |
| G02F 1/1368 | (2006.01) | |
| G02F 1/1333 | (2006.01) | |

(52) U.S. Cl.
CPC .......... *C09K 19/3402* (2013.01); *C09K 19/56* (2013.01); *G02F 1/1368* (2013.01); *G02F 1/133345* (2013.01); *G02F 1/134309* (2013.01); *C09K 2019/3422* (2013.01)

(58) Field of Classification Search
None
See application file for complete search history.

(56) References Cited

U.S. PATENT DOCUMENTS

| | | |
|---|---|---|
| 2006/0071194 A1 | 4/2006 | Masukawa et al. |
| 2013/0207038 A1 | 8/2013 | Haensel et al. |
| 2014/0084210 A1 | 3/2014 | Yanai et al. |

FOREIGN PATENT DOCUMENTS

| | | |
|---|---|---|
| CN | 103694214 | 4/2014 |
| DE | 3328638 | 2/1985 |
| DE | 3447359 | 7/1986 |
| DE | 19823194 | 12/1998 |
| DE | 19945890 | 4/2000 |
| DE | 10140419 | 3/2002 |
| DE | 102004036068 | 3/2005 |
| EP | 0135062 | 11/1987 |
| JP | 2009215261 | 9/2009 |
| JP | 2014062212 | 4/2014 |
| KR | 19957003626 | 9/1995 |
| KR | 1020080016672 | 2/2008 |
| WO | 9406885 | 3/1994 |
| WO | 9814418 | 4/1998 |
| WO | 2009031437 | 3/2009 |
| WO | 2014056573 | 4/2014 |

OTHER PUBLICATIONS

Detlef Pauluth, et al., "Advanced liquid crystals for television", J.Mater. Chem., vol. 14, 2004, pp. 1219-1227.

*Primary Examiner* — Chanceity Robinson
(74) *Attorney, Agent, or Firm* — Cantor Colburn LLP

(57) ABSTRACT

A liquid crystal composition includes a first class liquid crystal compound and a second class liquid crystal compound, wherein the first class liquid crystal compound includes one or more compounds represented by Chemical Formulas 1 to 8:

Chemical Formula 1

-continued
Chemical Formula 2
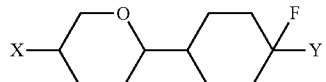
Chemical Formula 3
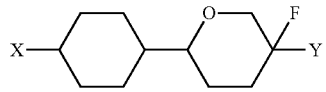
Chemical Formula 4
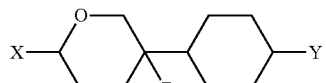
Chemical Formula 5
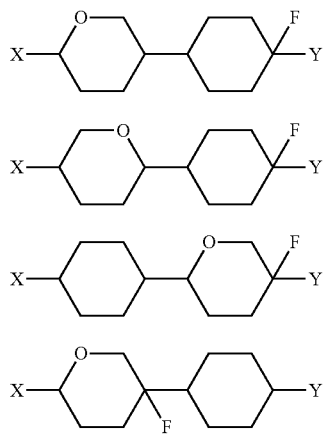
-continued
Chemical Formula 6
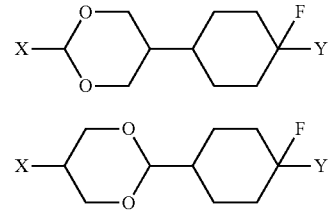
Chemical Formula 7
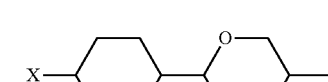
Chemical Formula 8
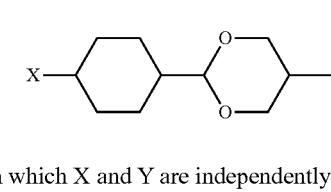
in which X and Y are independently a $C_1$-$C_7$ alkyl group.
30 Claims, 9 Drawing Sheets

LIQUID CRYSTAL COMPOSITON AND LIQUID CRYSTAL DISPLAY INCLUDING THE SAME

This application claims priority to Korean Patent Application No. 10-2014-0148234, filed on Oct. 29 2014, and all the benefits accruing therefrom under 35 U.S.C. §119, the content of which in its entirety is herein incorporated by reference.

BACKGROUND (1) Field

The present invention relates to a liquid crystal composition and a liquid crystal display including the same.

(2) Description of the Related Art

A liquid crystal display ("LCD") is a type of widely used flat panel displays. In the liquid crystal display, a voltage is applied to an electric field generating electrode to generate an electric field in a liquid crystal layer, such that the orientation of liquid crystal molecules in the liquid crystal layer may be determined and the transmittance of light transmitting through the liquid crystal layer may be adjusted.

In the liquid crystal display, the liquid crystal composition of the liquid crystal layer adjusts transmittance of light to obtain a desired image. As the liquid crystal display is variously used, the liquid crystal display may have various characteristics such as low voltage operation, high voltage holding ratio ("VHR"), a wide viewing angle, a wide operating temperature range, high-speed response, and the like.

Research into a technology for improving the physical properties of the liquid crystal composition, such as rotational viscosity, refractive index, elastic coefficient, and the like, has been conducted.

SUMMARY

The present invention provides a liquid crystal composition and a liquid crystal display including the same. The liquid crystal display has advantages of high-speed response characteristics, low viscosity, and the like.

In an exemplary embodiment, the present invention provides a liquid crystal composition includes: a first class liquid crystal compound; and a second class liquid crystal compound, where the first class liquid crystal compound includes one or more compounds represented by the following Chemical Formulas 1 to 8.

Chemical Formula 1
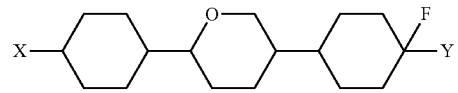

Chemical Formula 2
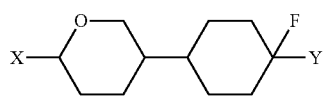

Chemical Formula 3
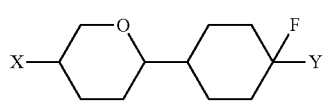

Chemical Formula 4
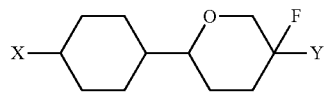

Chemical Formula 5
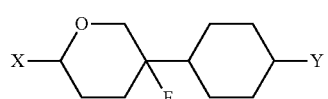

Chemical Formula 6
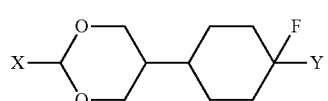

Chemical Formula 7
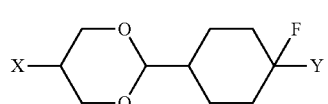

Chemical Formula 8
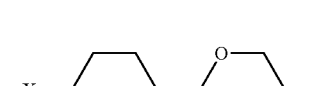

In Chemical Formulas 1 to 8, X and Y are independently a $C_1$-$C_7$ alkyl group.

In an exemplary embodiment, the second class liquid crystal compound includes one or more compounds represented by the following Chemical Formulas 9 to 13.

Chemical Formula 9
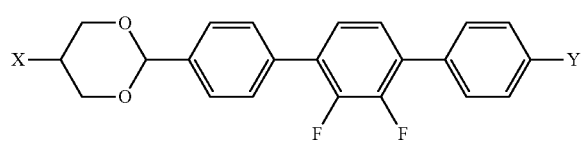

Chemical Formula 10
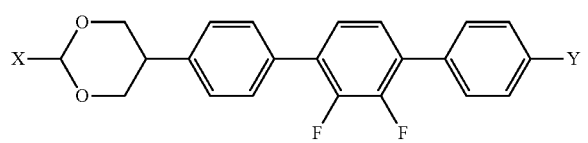

Chemical Formula 11
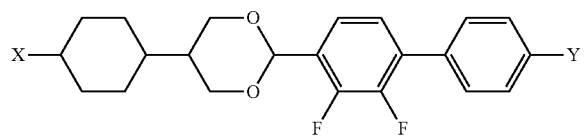

Chemical Formula 12
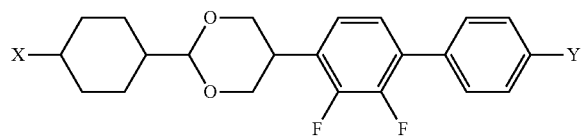

Chemical Formula 13
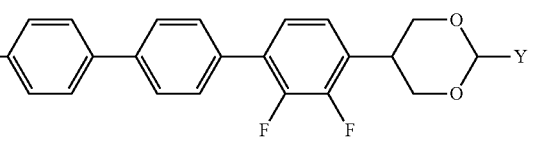

In the Chemical Formulas 9 to 13, X and Y are independently a $C_1$-$C_7$ alkyl group.

In an exemplary embodiment, the dielectric anisotropy (Δε) of the liquid crystal composition is about −5.5 to about −2.8.

In an exemplary embodiment, the liquid crystal composition further includes one or more compounds represented by the following Chemical Formulas 14 to 16.

Chemical Formula 14

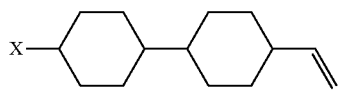

Chemical Formula 15

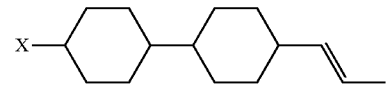

Chemical Formula 16

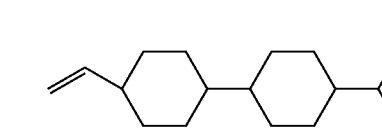

In the Chemical Formulas 14 to 16, X and Y are independently a $C_1$-$C_7$ alkyl group.

In an exemplary embodiment, the first class liquid crystal compound further includes one or more compounds represented by the following Chemical Formulas 17 to 20.

Chemical Formula 17

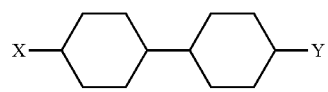

Chemical Formula 18

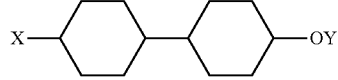

Chemical Formula 19

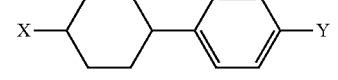

Chemical Formula 20

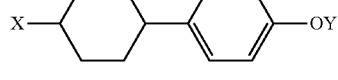

In the Chemical Formulas 17 to 20, X and Y are independently a $C_1$-$C_7$ alkyl group.

In an exemplary embodiment, the second class liquid crystal compound further includes one or more compounds represented by the following Chemical Formulas 21 to 26.

Chemical Formula 21

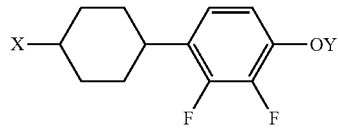

Chemical Formula 22

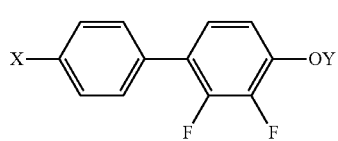

Chemical Formula 23

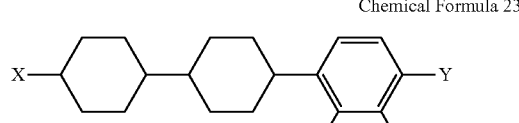

Chemical Formula 24

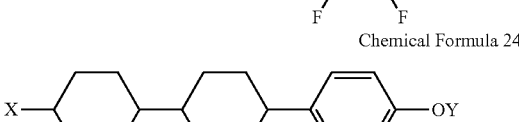

Chemical Formula 25

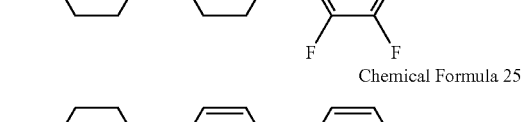

Chemical Formula 26

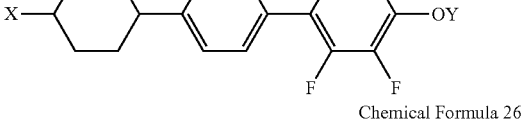

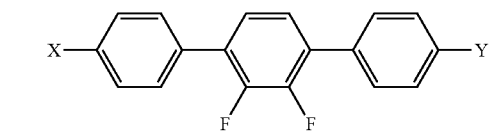

In the Chemical Formulas 21 to 26, X and Y are independently a $C_1$-$C_7$ alkyl group.

In an exemplary embodiment, a refractive index (Δn) of the liquid crystal composition is about 0.08 to about 0.12.

In an exemplary embodiment, the first class liquid crystal compound is present in an amount of about 10 wt % to about 45 wt %, based on the total weight of the liquid crystal composition.

In an exemplary embodiment, the second class liquid crystal compound is present in an amount of about 5 wt % to about 15 wt % based on the total weight of the liquid crystal composition.

In an exemplary embodiment, the liquid crystal composition has a dielectric anisotropy (Δε) of about 5 to about 17, and a refractive index (Δn) of about 0.08 to about 0.15.

In an exemplary embodiment, the first class liquid crystal compound is present in an amount of about 2 wt % to about 20 wt % based on the entire content of the liquid crystal composition.

In an exemplary embodiment, the liquid crystal composition further includes one or more compounds represented by the following Chemical Formulas 27 to 33.

Chemical Formula 27

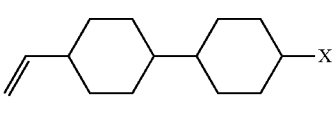

Chemical Formula 28

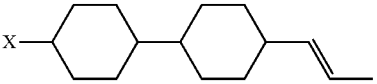

Chemical Formula 29
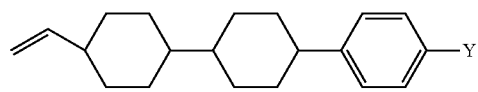

Chemical Formula 30
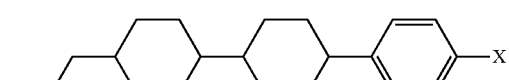

Chemical Formula 31
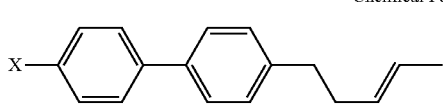

Chemical Formula 32
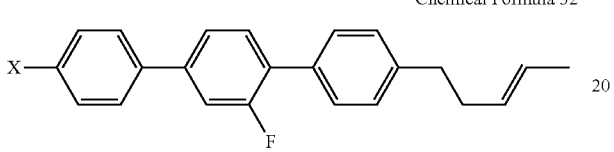

Chemical Formula 33
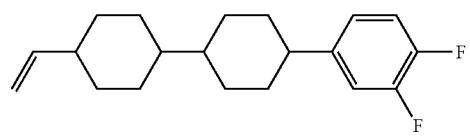

In the Chemical Formulas 27 to 33, X and Y are independently a $C_1$-$C_7$ alkyl group.

In an exemplary embodiment, the first class liquid crystal compound further includes one or more compounds represented by the following Chemical Formulas 34 to 38.

Chemical Formula 34
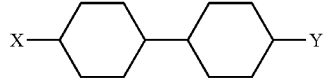

Chemical Formula 35
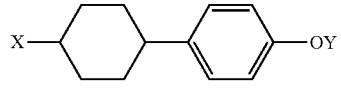

Chemical Formula 36
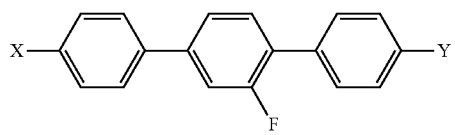

Chemical Formula 37
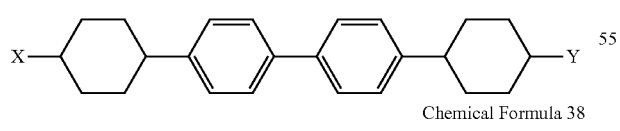

Chemical Formula 38
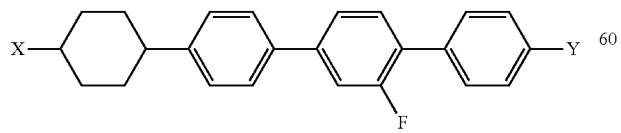

In the Chemical Formulas 34 to 38, X and Y are independently a $C_1$-$C_7$ alkyl group.

In an exemplary embodiment, the second class liquid crystal compound further includes one or more compounds represented by the following Chemical Formulas 39 to 49.

Chemical Formula 39
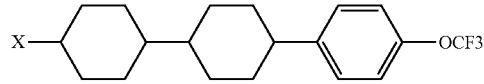

Chemical Formula 40
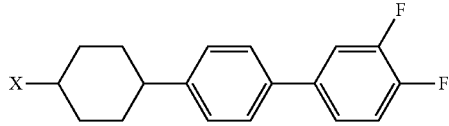

Chemical Formula 41
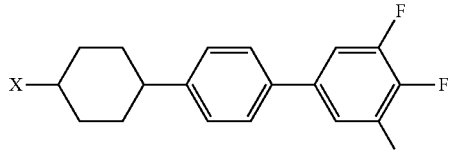

Chemical Formula 42
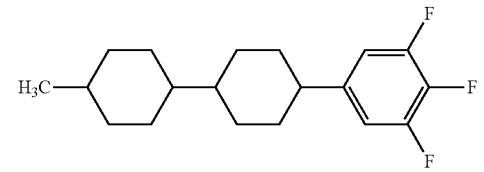

Chemical Formula 43
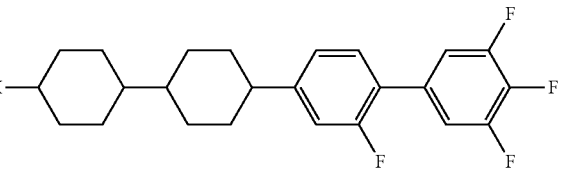

Chemical Formula 44
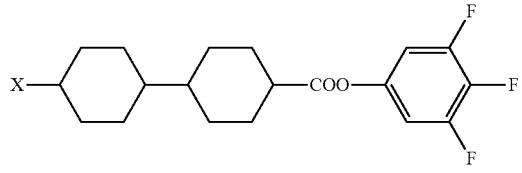

Chemical Formula 45
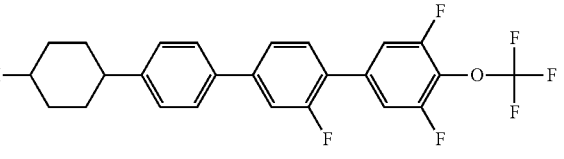

Chemical Formula 46
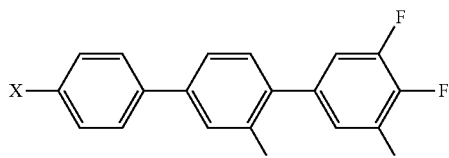

Chemical Formula 47

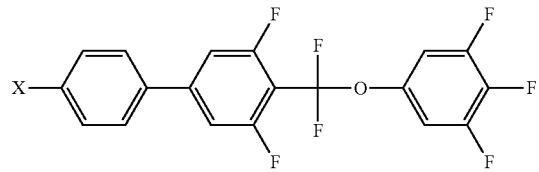

Chemical Formula 48

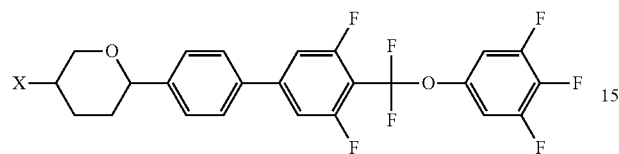

Chemical Formula 49

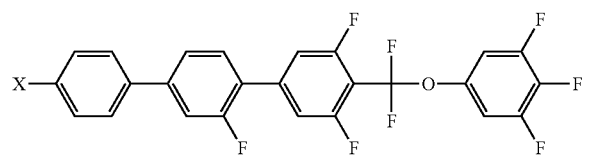

In the Chemical Formulas 39 to 49, X and Y are independently a $C_1$-$C_7$ alkyl group.

In another exemplary embodiment, the present invention provides a liquid crystal display including: a first insulation substrate; a thin film transistor positioned on the first insulation substrate; a pixel electrode connected to the thin film transistor; a second insulation substrate facing the first insulation substrate; a common electrode positioned on the second insulation substrate; and a liquid crystal layer positioned between the common electrode and the pixel electrode, where the liquid crystal layer includes a first class liquid crystal compound and a second class liquid crystal compound, and the first class liquid crystal compound includes one or more compounds represented by the following Chemical Formulas 1 to 8.

Chemical Formula 1

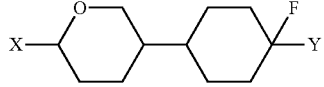

Chemical Formula 2

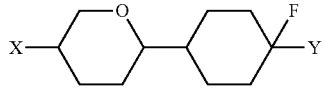

Chemical Formula 3

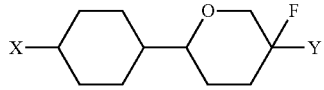

Chemical Formula 4

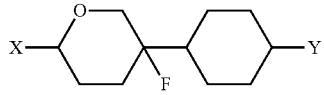

Chemical Formula 5

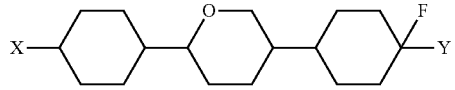

Chemical Formula 6

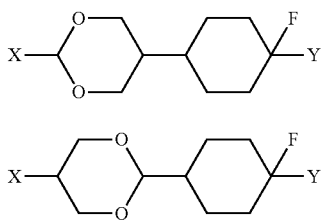

Chemical Formula 7

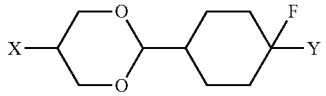

Chemical Formula 8

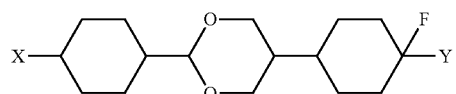

In the Chemical Formulas 1 to 8, X and Y are independently a $C_1$-$C_7$ alkyl group.

In an exemplary embodiment, the second class liquid crystal compound includes one or more compounds represented by the following Chemical Formulas 9 to 13.

Chemical Formula 9

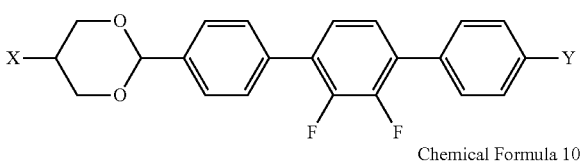

Chemical Formula 10

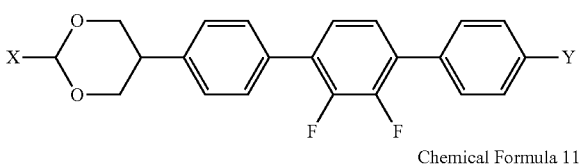

Chemical Formula 11

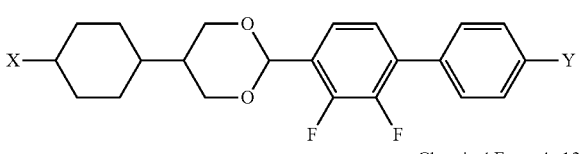

Chemical Formula 12

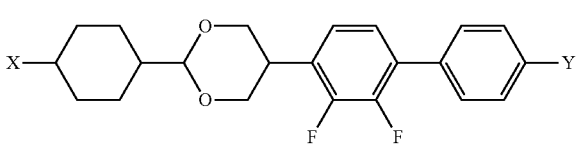

Chemical Formula 13

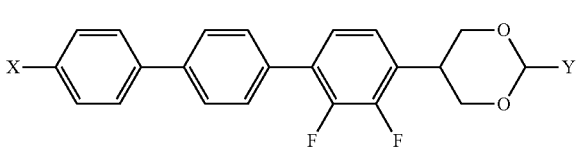

In the Chemical Formulas 9 to 13, X and Y are independently a $C_1$-$C_7$ alkyl group.

In an exemplary embodiment, the liquid crystal layer has a dielectric anisotropy ($\Delta\epsilon$) of about −5.5 to about −2.8.

In an exemplary embodiment, the liquid crystal layer further includes one or more compounds represented by the following Chemical Formulas 14 to 16.

Chemical Formula 14

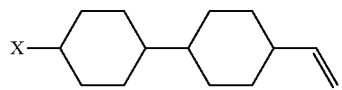

Chemical Formula 15

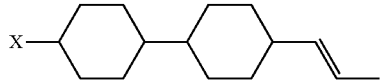

Chemical Formula 16

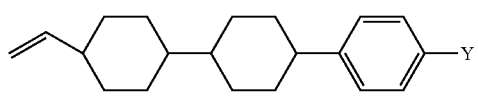

In the Chemical Formulas 14 to 16, X and Y are independently a $C_1$-$C_7$ alkyl group.

In an exemplary embodiment, the first class liquid crystal compound further includes one or more compounds represented by the following Chemical Formulas 17 to 20.

Chemical Formula 17

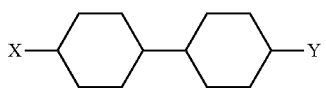

Chemical Formula 18

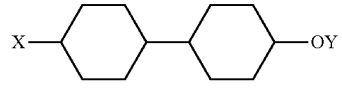

Chemical Formula 19

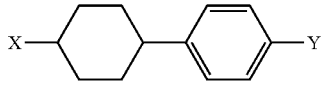

Chemical Formula 20

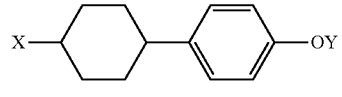

In the Chemical Formulas 17 to 20, X and Y are independently a $C_1$-$C_7$ alkyl group.

In an exemplary embodiment, the second class liquid crystal compound further includes one or more compounds represented by the following Chemical Formulas 21 to 26.

Chemical Formula 21

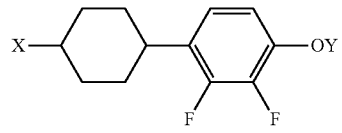

Chemical Formula 22

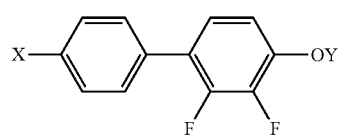

Chemical Formula 23

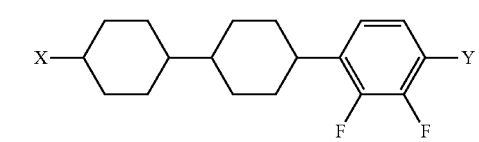

Chemical Formula 24

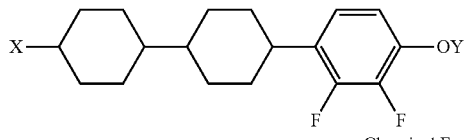

Chemical Formula 25

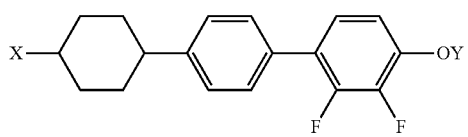

Chemical Formula 26

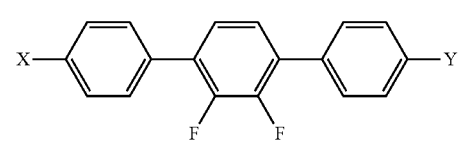

In the Chemical Formulas 21 to 26, X and Y are independently a $C_1$-$C_7$ alkyl group.

In an exemplary embodiment, the liquid crystal layer further includes a reactive mesogen (RM).

In an exemplary embodiment, the liquid crystal layer has a refractive index ($\Delta n$) of about 0.08 to about 0.12.

In an exemplary embodiment, the first class liquid crystal compound is present in an amount of about 10 wt % to about 45 wt % based on the total weight of the liquid crystal layer.

In an exemplary embodiment, the second class liquid crystal compound is present in an amount of about 5 wt % to about 15 wt % based on the total weight of the liquid crystal layer.

In yet another embodiment, the present invention provides a liquid crystal display including: a first insulation substrate; a thin film transistor positioned on the first insulation substrate; a pixel electrode connected to the thin film transistor; a common electrode insulated from the pixel electrode and positioned on the first insulation substrate; a second insulation substrate facing the first insulation substrate; and a liquid crystal layer positioned between the first insulation substrate and the second insulation substrate, where the liquid crystal layer includes a first class liquid crystal compound and a second class liquid crystal compound; and the first class liquid crystal compound includes one or more compounds represented by the following Chemical Formulas 1 to 8.

Chemical Formula 1

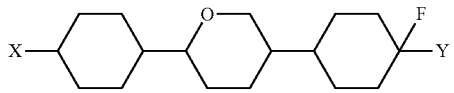

Chemical Formula 2

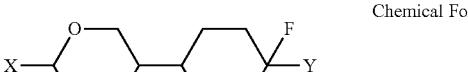

Chemical Formula 3

Chemical Formula 4
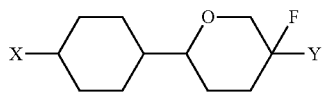

Chemical Formula 5

Chemical Formula 6
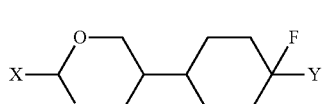

Chemical Formula 7

Chemical Formula 8

In the Chemical Formulas 1 to 8, X and Y are independently a $C_1$-$C_7$ alkyl group.

In an exemplary embodiment, the liquid crystal layer has a dielectric anisotropy (Δ∈) of about 5 to about 17, and a refractive index (Δn) of about 0.08 to about 0.15.

In an exemplary embodiment, the liquid crystal layer further includes one or more compounds represented by the following Chemical Formulas 27 to 33.

Chemical Formula 27
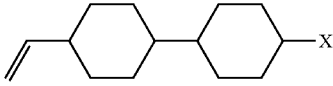

Chemical Formula 28
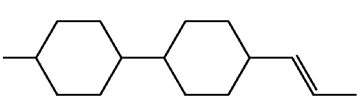

Chemical Formula 29

Chemical Formula 30
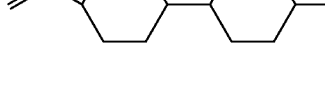

Chemical Formula 31
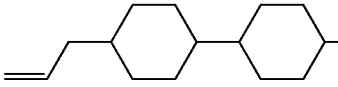

Chemical Formula 32
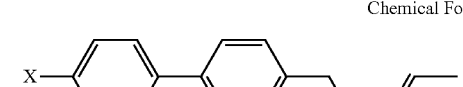

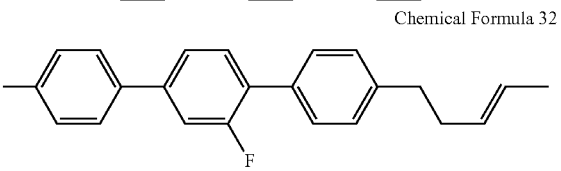

Chemical Formula 33
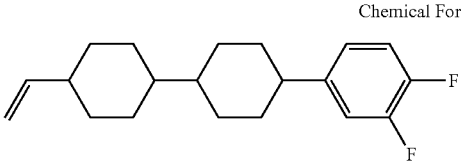

In the Chemical Formulas 27 to 33, X and Y are independently a $C_1$-$C_7$ alkyl group.

In an exemplary embodiment, the first class liquid crystal compound is present in an amount of about 2 wt % to about 20 wt % based on the total weight of the liquid crystal layer.

In an exemplary embodiment, the first class liquid crystal compound further includes one or more compounds represented by the following Chemical Formulas 34 to 38.

Chemical Formula 34
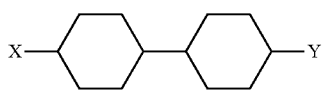

Chemical Formula 35
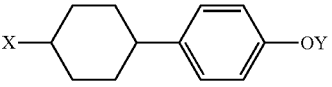

Chemical Formula 36
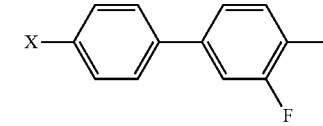

Chemical Formula 37

Chemical Formula 38

In the Chemical Formulas 34 to 38, X and Y are independently a $C_1$-$C_7$ alkyl group.

In an exemplary embodiment, the second class liquid crystal compound further includes one or more compounds represented by the following Chemical Formulas 39 to 49.

Chemical Formula 39
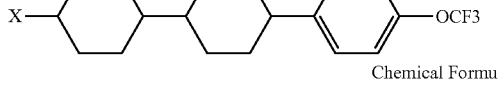

Chemical Formula 40
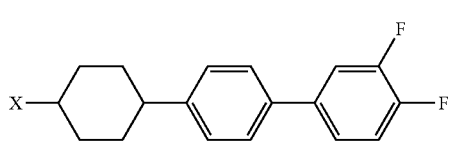

Chemical Formula 41

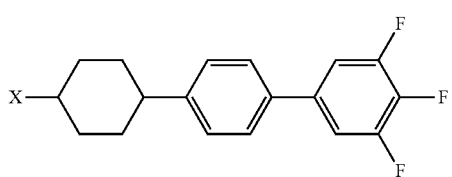

Chemical Formula 42

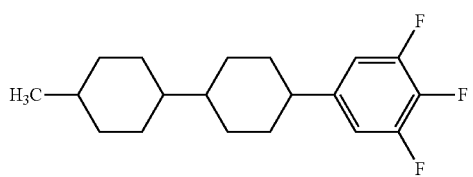

Chemical Formula 43

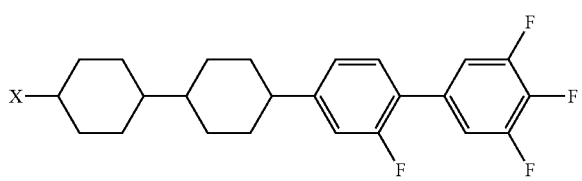

Chemical Formula 44

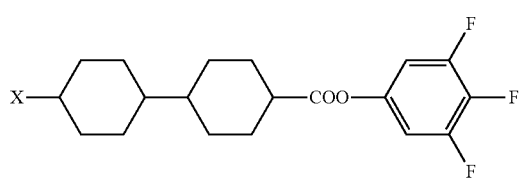

Chemical Formula 45

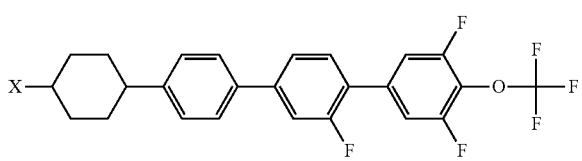

Chemical Formula 46

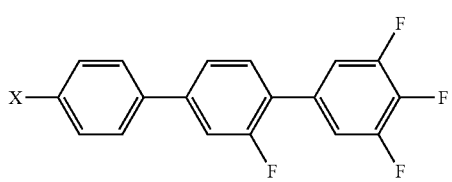

Chemical Formula 47

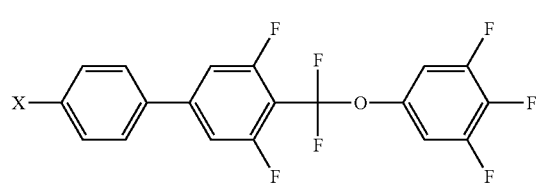

Chemical Formula 48

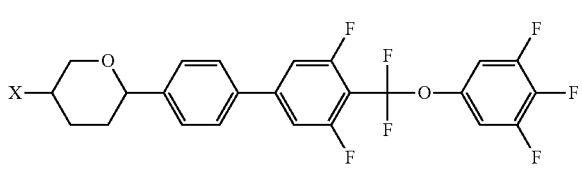

Chemical Formula 49

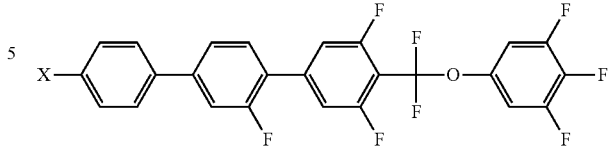

In the Chemical Formulas 39 to 49, X and Y are independently a $C_1$-$C_7$ alkyl group.

According to an exemplary embodiment of the present invention, the liquid crystal composition having a high dielectric constant and low viscosity characteristics is used to form a liquid crystal display having high-speed response characteristics. In addition, alkenyl compounds for which reliability is deteriorated can be substituted with the exemplary liquid crystal composition according to the present invention, thereby preventing the reliability of the liquid crystal layer from being deteriorated.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
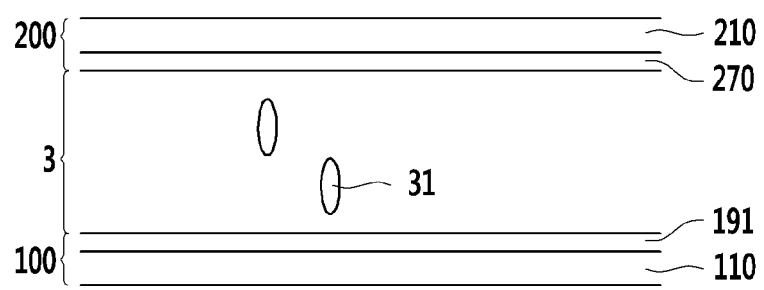
FIG. 1 is a schematic cross-sectional view of an exemplary embodiment of a liquid crystal display according to the present invention.

The invention will now be described more fully hereinafter with reference to the accompanying drawings, in which various embodiments are shown. However, the invention is not limited to the exemplary embodiments which are described herein, and may, however, be embodied in many different forms. Rather, these embodiments are provided so that this disclosure can be thorough and complete, and will fully convey the scope of the invention to those skilled in the art to which the present invention pertains. Like reference numerals refer to like elements throughout.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
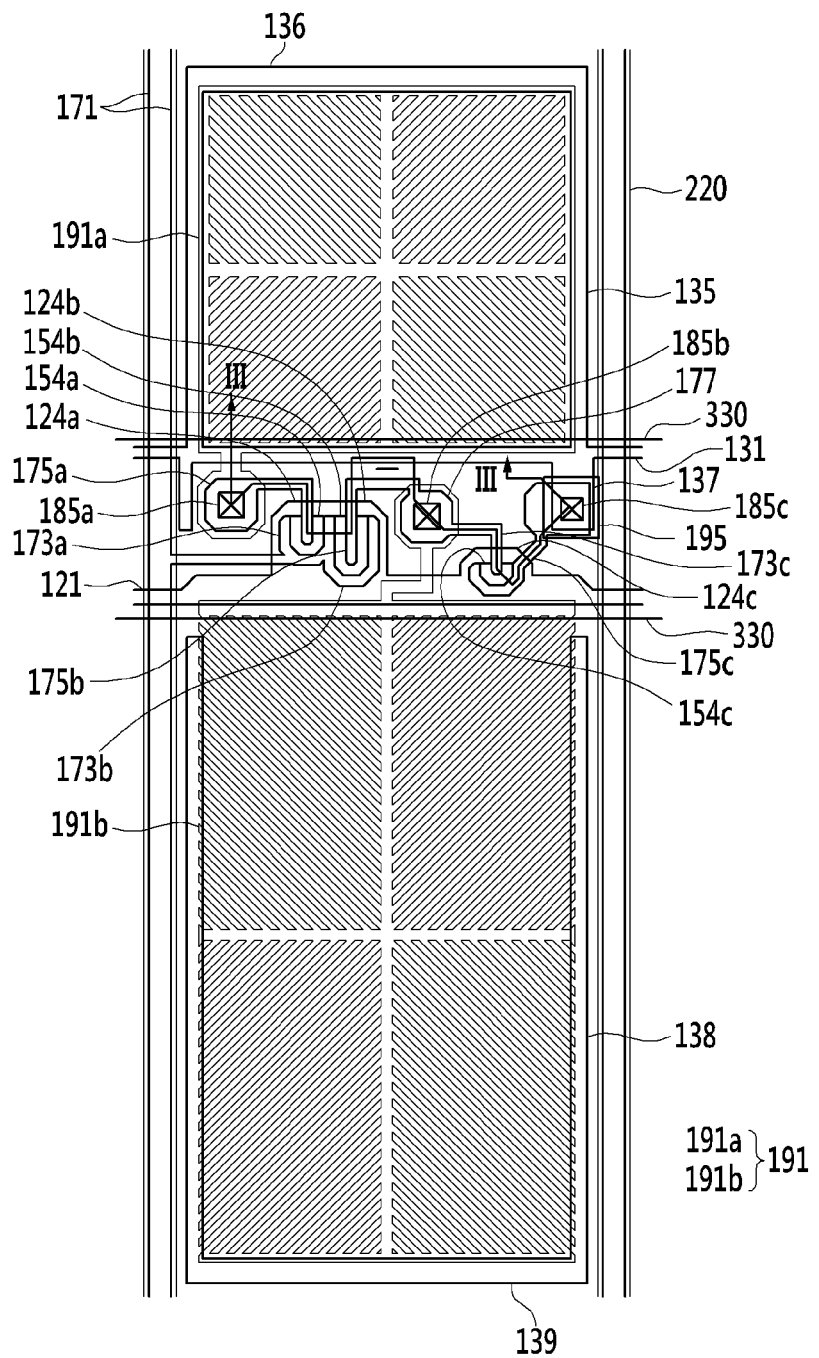
FIG. 2 is a layout view of one pixel area of an exemplary embodiment of the liquid crystal display according to the present invention.
Figure 3:
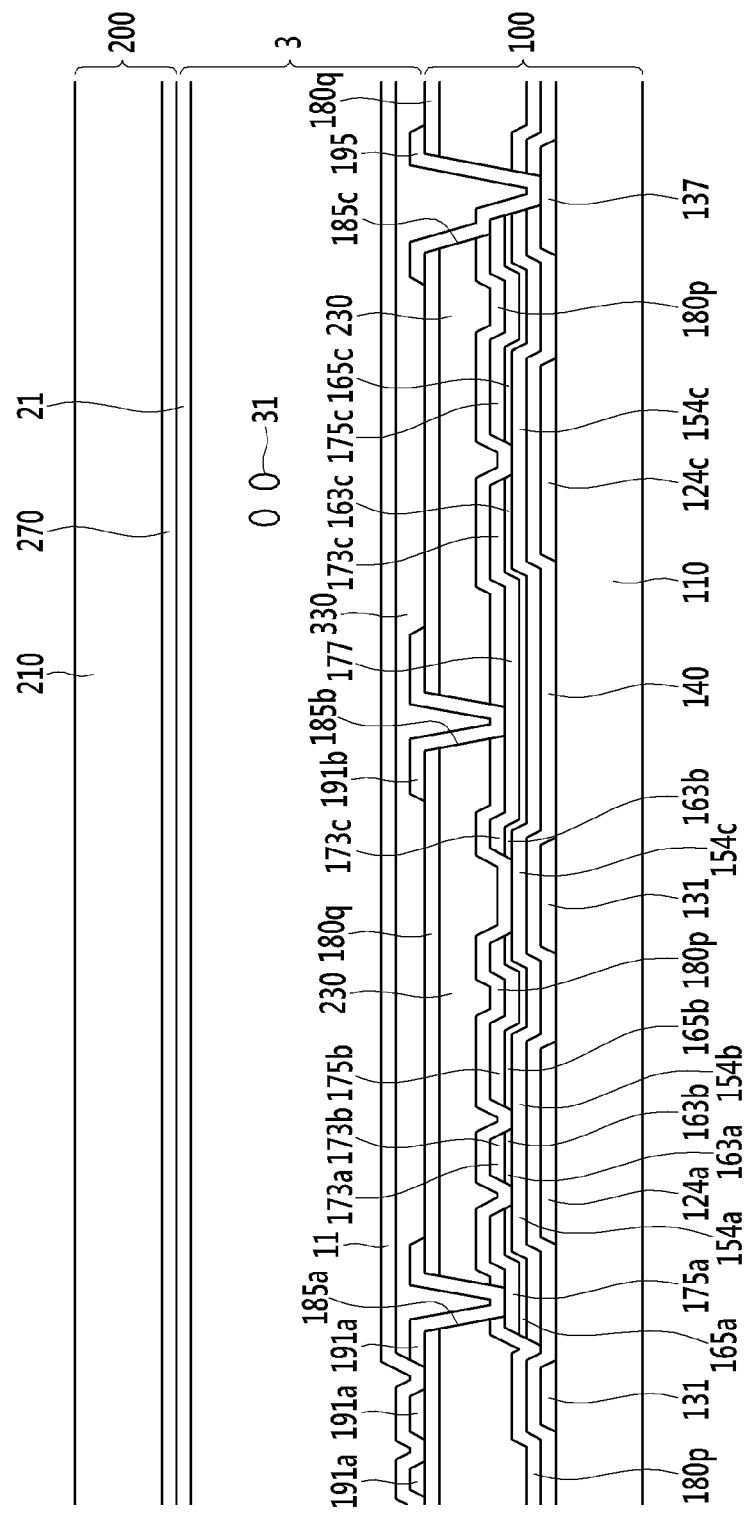
FIG. 3 is a cross-sectional view of an exemplary embodiment of one pixel area taken along line III-III in FIG. 2.
Figure 4:
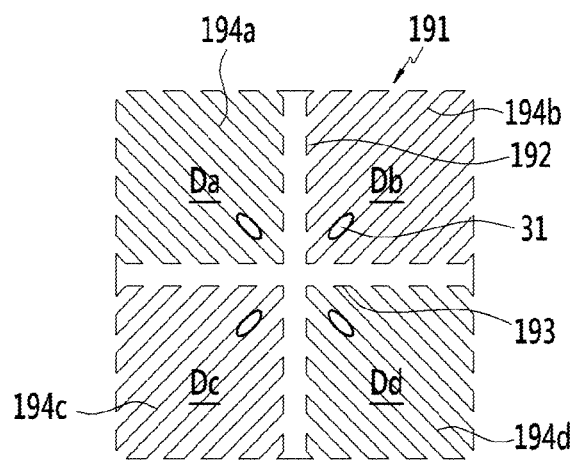
FIG. 4 is an illustration of a basic structure of an exemplary embodiment of the pixel electrode shown in FIG. 2.
Figure 5:
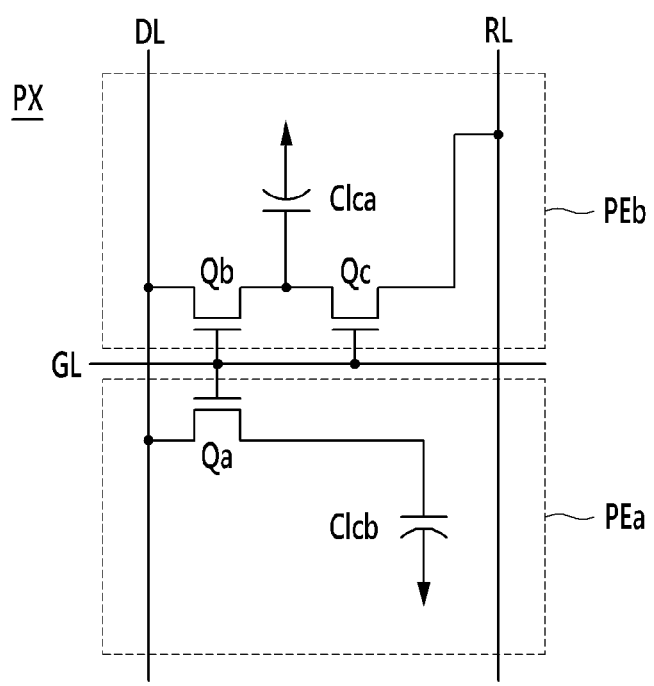
FIG. 5 is an equivalent circuit diagram of one pixel area of an exemplary embodiment of the liquid crystal display according to the present invention.

Hereinafter, exemplary embodiments of a liquid crystal composition and a liquid crystal display including the liquid crystal composition will be described with reference to FIGS. 1 to 5. FIG. 1 is a schematic cross-sectional view of an exemplary embodiment of a liquid crystal display according to the present invention, FIG. 2 is a plan view of one pixel area of an exemplary embodiment of the liquid crystal display according to the present invention. FIG. 3 is a cross-sectional view of an exemplary embodiment of one pixel area taken along line III-III in FIG. 2. FIG. 4 is an illustration of a basic structure of a an exemplary embodiment of the pixel electrode shown in FIG. 2. FIG. 5 is an equivalent circuit diagram of one pixel area of an exemplary embodiment of the liquid crystal display according to the present invention.

First, referring to FIG. 1, the liquid crystal display includes a lower display panel 100 including a first insulation substrate 110 and a pixel electrode 191, an upper display panel 200 including a second insulation substrate 210 and a common electrode 270, and a liquid crystal layer 3 interposed between the lower and upper display panels 100 and 200. The lower display panel 100 and the upper display panel 200 face each other.

The liquid crystal layer 3 includes liquid crystal molecules 31 configuring the liquid crystal composition. Hereinafter, an exemplary embodiment of the liquid crystal composition forming the liquid crystal layer 3 will be specifically described.

In an exemplary embodiment, the liquid crystal composition may include a first class liquid crystal compound, including a neutral liquid crystal compound and a second class liquid crystal compound including a polar liquid crystal compound.

The first class liquid crystal compound may include one or more compounds represented by the following Chemical Formulas 1 to 8.

Chemical Formula 1

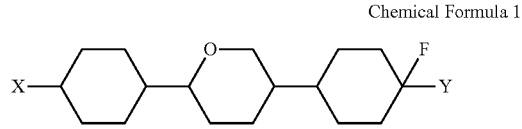

-continued

Chemical Formula 2
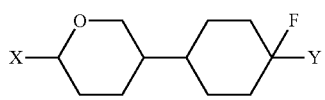

Chemical Formula 3
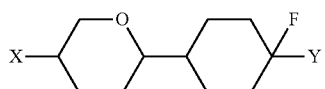

Chemical Formula 4
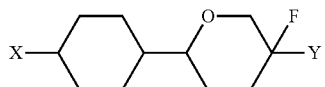

Chemical Formula 5
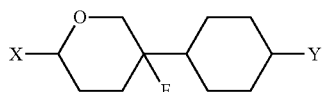

Chemical Formula 6
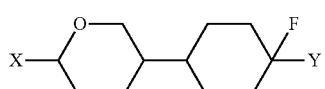

Chemical Formula 7
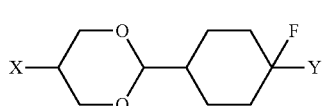

Chemical Formula 8
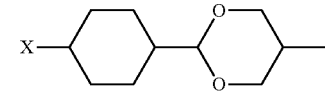

In the Chemical Formulas 1 to 8, X and Y are each independently a $C_1$-$C_7$ alkyl group. The compounds represented by Chemical Formulas 1 to 5 are neutral liquid crystal compounds including tetrahydropyran, and the compounds represented by Chemical Formulas 6 to 8 are neutral liquid crystal compounds including 1,3-dioxane.

In the compounds represented by Chemical Formula 1, the refractive index ($\Delta n$) is about 0.06 and the dielectric anisotropy ($\Delta \in$) is about −1.0. In the compounds represented by Chemical Formula 2, the refractive index ($\Delta n$) is about 0.03 and the dielectric anisotropy ($\Delta \in$) is about 0.8. In the compounds represented by Chemical Formula 3, the refractive index ($\Delta n$) is about 0.03 and the dielectric anisotropy ($\Delta \in$) is about 0.8. In the compounds represented by Chemical Formula 4, the refractive index ($\Delta n$) is about 0.03 and the dielectric anisotropy ($\Delta \in$) is about 2.3. In the compounds represented by Chemical Formula 5, the refractive index ($\Delta n$) is about 0.03 and the dielectric anisotropy ($\Delta \in$) is about 2.2. In the compounds represented by Chemical Formula 6, the refractive index ($\Delta n$) is about 0.03 and the dielectric anisotropy ($\Delta \in$) is about 2.2. In the compounds represented by Chemical Formula 7, the refractive index ($\Delta n$) is about 0.03 and the dielectric anisotropy ($\Delta \in$) is about 1.5. In the compounds represented by Chemical Formula 8, the refractive index ($\Delta n$) is about 0.03 and the dielectric anisotropy ($\Delta \in$) is about −1.0.

The first class liquid crystal compound may be included in the liquid crystal composition in an amount of about 10 wt % to about 45 wt % based on the total weight of the liquid crystal composition.

In an exemplary embodiment, the second class liquid crystal compound according to the present invention may include one or more compounds represented by the following Chemical Formulas 9 to 13.

Chemical Formula 9
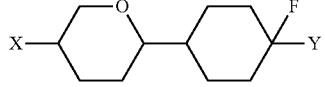

Chemical Formula 10
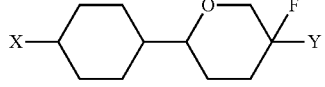

Chemical Formula 11
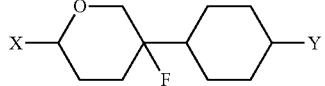

Chemical Formula 12
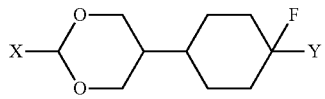

Chemical Formula 13
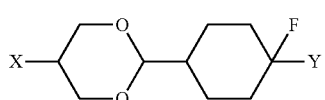

In the Chemical Formulas 9 to 13, X and Y are each independently a $C_1$-$C_7$ alkyl group. The compounds represented by Chemical Formulas 9 to 13 are polar liquid crystal compounds including 1,3-dioxane.

In the compounds represented by Chemical Formula 9, the refractive index ($\Delta n$) is about 0.28 and the dielectric anisotropy ($\Delta \in$) is about −3.6. In the compounds represented by Chemical Formula 10, the refractive index ($\Delta n$) is about 0.27 and the dielectric anisotropy ($\Delta \in$) is about −3.4. In the compounds represented by Chemical Formula 11, the refractive index ($\Delta n$) is about 0.17 and the dielectric anisotropy ($\Delta \in$) is about −3.2. In the compounds represented by Chemical Formula 12, the refractive index ($\Delta n$) is about 0.17 and the dielectric anisotropy ($\Delta \in$) is about −2.8. In the compounds represented by Chemical Formula 13, the refractive index ($\Delta n$) is about 0.26 and the dielectric anisotropy ($\Delta \in$) is about −2.9.

The second class liquid crystal compound may be included in the liquid crystal composition in an amount of about 5 wt % to about 15 wt % based on the total weight of the liquid crystal composition.

In addition, in an exemplary embodiment, the liquid crystal composition according to the present invention may further include one or more compounds represented by the following Chemical Formulas 14 to 16.

Chemical Formula 14

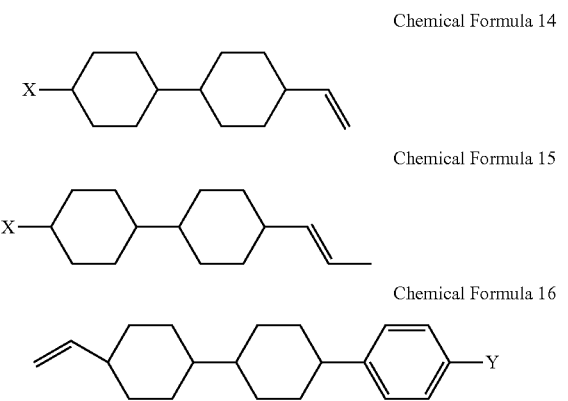

Chemical Formula 15

Chemical Formula 16

In the Chemical Formulas 14 to 16, X and Y are each independently a $C_1$-$C_7$ alkyl group. The compound represented by the Chemical Formulas 14 to 16 may be included in the liquid crystal composition in an amount of about 20 wt % to about 40 wt % based on the total weight of the liquid crystal composition.

In addition, the first class liquid crystal compound including the neutral liquid crystal compound may further include one or more compounds represented by the following Chemical Formulas 17 to 20.

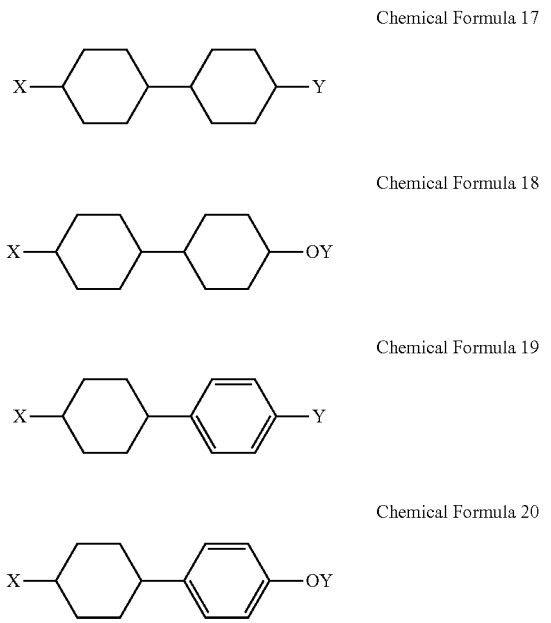

Chemical Formula 17

Chemical Formula 18

Chemical Formula 19

Chemical Formula 20

In the Chemical Formulas 17 to 20, X and Y are each independently a $C_1$-$C_7$ alkyl group. The compound represented by Chemical Formulas 17 to 20 may be included in the liquid crystal composition in amount of about 15 wt % to about 43 wt % based on the total weight of the liquid crystal composition.

In addition, the second class liquid crystal compound including the polar liquid crystal compound may further include one or more compounds represented by the following Chemical Formulas 21 to 26.

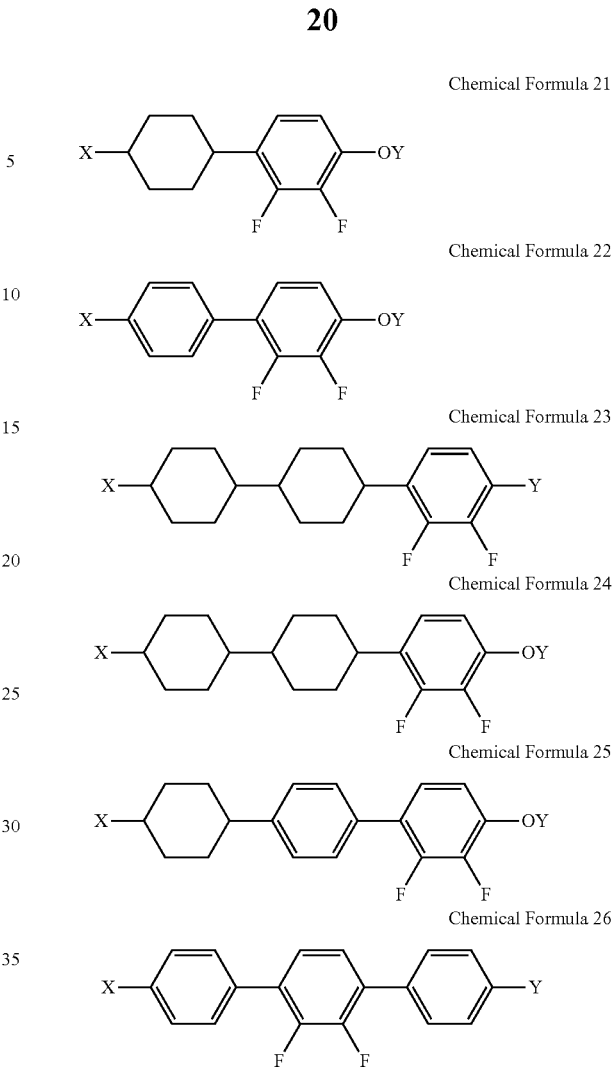

Chemical Formula 21

Chemical Formula 22

Chemical Formula 23

Chemical Formula 24

Chemical Formula 25

Chemical Formula 26

In the Chemical Formulas 21 to 26, X and Y are each independently a $C_1$-$C_7$ alkyl group. The compound represented by the Chemical Formulas 21 to 26 may be included in the liquid crystal composition in amounts of about 50 wt % to about 65 wt % based on the total weight of the liquid crystal composition.

The liquid crystal composition including the first class and second class liquid crystal compounds described above may have a refractive index ($\Delta n$) of about 0.08 to about 0.12, a dielectric anisotropy ($\Delta \in$) of about −5.5 to about −2.8, and a rotational viscosity ($\gamma 1$) of about 70 to about 140.

The first class and second class liquid crystal compounds as described above, includes the neutral liquid crystal compound and the polar liquid crystal compound, respectively, each having a novel structure, and therefore a more stable liquid crystal composition may be provided.

Hereinafter, constituent elements of the liquid crystal display including the liquid crystal composition described above, will be specifically described with reference to FIGS. 2 to 5.

First, referring to FIGS. 2 and 3, in an exemplary embodiment, the liquid crystal display includes the lower display panel 100 and the upper display panel 200 facing each other, the liquid crystal layer 3 interposed between these two display panels 100 and 200, and a pair of polarizers (not shown) attached on outer surfaces of the display panels 100 and 200.

The lower display panel 100 will now be described.

A gate conductor including a gate line 121 and a divided reference voltage line 131 is positioned on the first insulation substrate 110. The first insulation substrate may be formed of transparent glass, plastic, or the like.

The gate line 121 includes a first gate electrode 124a, a second gate electrode 124b, a third gate electrode 124c, and a wide end portion (not shown) for allowing a connection with other layers or external driving circuits.

The divided reference voltage line 131 includes first sustain electrodes 135 and 136 and a reference electrode 137. Second sustain electrodes 138 and 139 are not connected to the divided reference voltage line 131 but are overlapped with a second sub-pixel electrode 191b.

A gate insulating layer 140 is positioned on the gate line 121 and the divided reference voltage line 131. A first semiconductor layer 154a, a second semiconductor layer 154b, and a third semiconductor layer 154c are positioned on the gate insulating layer 140. A plurality of ohmic contacts 163a, 165a, 163b, 165b, 163c, and 165c are positioned on the semiconductor layers 154a, 154b, and 154c.

Data conductors including a plurality of data lines 171 including a first source electrode 173a and a second source electrode 173b, a first drain electrode 175a, a second drain electrode 175b, a third source electrode 173c, and a third drain electrode 175c are positioned on the ohmic contacts 163a, 165a, 163b, 165b, 163c, and 165c and the gate insulating layer 140.

The data conductors and semiconductors, and the ohmic contacts positioned therebelow, may be simultaneously formed using one mask, and may have substantially the same plane shape.

The data line 171 includes the wide end portion (not shown) for allowing a connection with other layers or external driving circuits.

The first gate electrode 124a, the first source electrode 173a, and the first drain electrode 175a form a first thin film transistor ("TFT") Qa together with the island-shaped first semiconductor layer 154a. A channel of the thin film transistor is formed in the semiconductor layer 154a between the first source electrode 173a and the first drain electrode 175a. Similarly, the second gate electrode 124b, the second source electrode 173b, and the second drain electrode 175b form a second thin film transistor Qb together with the island-shaped second semiconductor layer 154b, and a channel of the thin film transistor is formed in the semiconductor layer 154b between the second source electrode 173b and the second drain electrode 175b. The third gate electrode 124c, the third source electrode 173c, and the third drain electrode 175c form a third thin film transistor Qc together with the island-shaped third semiconductor layer 154c, and a channel of the thin film transistor is formed in the third semiconductor layer 154c between the third source electrode 173c and the third drain electrode 175c.

The second drain electrode 175b is connected to the third source electrode 173c, and includes an expanding part 177 which is widely expanded.

A first passivation layer 180p is positioned on portions of the data line 171, the expanding part 177, source electrodes 173a, 173b, 173c, drain electrodes 175a, 175b, and 175c, and on the exposed portions of semiconductor layers 154a, 154b, and 154c. The first passivation layer 180p may include an inorganic insulating layer including a material such as a silicon nitride, a silicon oxide, or the like. The first passivation layer 180p may prevent inflow of pigment from a color filter 230 into the exposed portion of the semiconductor layers 154a, 154b, and 154c.

The color filter 230 is positioned on the first passivation layer 180p. The color filter 230 is extended in a vertical direction along two data lines adjacent to each other. A first light blocking member 220 is positioned on the first passivation layer 180p, an edge of the color filter 230, and the data line 171.

The first light blocking member 220 is also referred to as a black matrix ("BM"). The first light blocking member 220 may be positioned between two adjacent color filters 230 while extending along the data line 171.

By forming the first light blocking member 220 to be wider than the data line 171 as described above, the first light blocking member 220 may prevent reflection of incident light from the outside on a surface of the data line 171, which is a metal. The light reflected on the surface of the data line 171 interferes with light transmitting through the liquid crystal layer 3 thus deteriorating the contrast ratio of the liquid crystal display.

A second passivation layer 180q is positioned on the color filter 230 and the first light blocking member 220.

The second passivation layer 180q may include an inorganic insulating layer including a material such as a silicon nitride, a silicon oxide, or the like. The second passivation layer 180q serves to prevent defects, such as an afterimage, which may be caused upon driving a screen. The second passivation layer 180q prevents the color filter 230 from being delaminated and suppresses contamination of the liquid crystal layer 3 by preventing an organic material, such as a solvent from the color filter 230, from entering the liquid crystal layer.

A first contact hole 185a exposing the first drain electrode 175a, and a second contact hole 185b exposing the extended portion 177 of the second drain electrode 175b, are formed in the first passivation layer 180p and the second passivation layer 180q.

A third contact hole 185c, exposing a portion of the reference electrode 137 and a portion of the third drain electrode 175c, is formed in the first passivation layer 180p and the second passivation layer 180q, and the gate insulating layer 140, and the third contact hole 185c are covered with a connecting member 195. The connecting member 195 electrically connects the reference electrode 137 and the third drain electrode 175c exposed through the third contact hole 185c.

A plurality of pixel electrodes 191 are positioned on the second passivation layer 180q. The pixel electrodes 191 are separated with the gate line 121 interposed therebetween, and include a first sub-pixel electrode 191a and a second sub-pixel electrode 191b adjacent in a column direction based on the gate line 121.

The pixel electrodes 191 may be formed of transparent materials such as indium tin oxide ("ITO"), indium zinc oxide ("IZO"), and the like. The pixel electrodes 191 may be formed of a transparent conductive material such as ITO, IZO, or the like, or a reflective metal such as aluminum, silver, chromium, alloys thereof, or the like.

The first sub-pixel electrode 191a and the second sub-pixel electrode 191b include one or more of the basic electrode 191 shown in FIG. 4, or a modification of the basic electrode.

The first sub-pixel electrode 191a and the second sub-pixel electrode 191b are physically and electrically connected to the first drain electrode 175a and the second drain electrode 175b through the first contact hole 185a and the second contact hole 185b, respectively, and receive data voltage from the first drain electrode 175a and the second drain electrode 175b. In this case, a portion of the data voltage applied to the second drain electrode 175b is divided by the third source electrode 173c, such that a size of the voltage applied to the first sub-pixel electrode 191a is larger than that of the voltage applied to the second sub-pixel electrode 191b.

The first sub-pixel electrode 191a and the second sub-pixel electrode 191b, when applied with the data voltage, produce an electric field together with the common electrode 270 of the upper display panel 200 to determine the direction of the liquid crystal molecules 31 of the liquid crystal layer 3 between the pixel electrodes 191a, 191b and the common electrode 270. Luminance of light transmitting through the liquid crystal layer 3 is changed depending on the direction of the liquid crystal molecules 31 determined as described above.

A second light blocking member 330 is positioned on the pixel electrode 191. The second light blocking member 330 is formed so as to cover the entire region in which the first transistor Qa, the second transistor Qb, the third transistor Qc, and the first to third contact holes 185a, 185b, and 185c, are positioned. The second light blocking member 330 is extended in the same direction as the gate line 121 to be overlapped with the portion of the data line 171. The second light blocking member 330 is also overlapped with at least one portion of two data lines 171 positioned at respective sides of one pixel area, thereby preventing light leakage which may be generated around the data line 171 and the gate line 121, and preventing light leakage at the region in which the first transistor Qa, the second transistor Qb, and the third transistor Qc are positioned.

Before the second light blocking member 330 is formed, the first passivation layer 180p, the color filter 230, and the second passivation layer 180q are positioned in the region in which the first transistor Qa, the second transistor Qb, the third transistor Qc, and the first to third contact holes 185a, 185b, and 185c are positioned, such that each position of the first transistor Qa, the second transistor Qb, the third transistor Qc, and the first to third contact holes 185a, 185b, and 185c may be easily classified.

As an exemplary variation of the above-described second light blocking member 330, the second light blocking member 330 may be positioned on the same layer as the first light blocking member 220. In this case, the second light blocking member 330 may be positioned so as to cover the region in which the first transistor Qa, the second transistor Qb, and the third transistor Qc are positioned, may be extended in the same direction as the gate line 121, and may be simultaneously formed with the first light blocking member 220.

A first alignment layer 11 is positioned on the second light blocking member 330. The first alignment layer 11 may be a vertical alignment layer.

The first alignment layer 11 and a second alignment layer 21 may be liquid crystal alignment layers including a polyamic acid, a polyimide, or the like, and may be formed from at least one generally used liquid crystal alignment layer material.

Now, the upper display panel 200 is described.

A common electrode 270 is formed on an insulation substrate 210. A second alignment layer 21 is formed on the common electrode 270. The second alignment layer 21 may be a vertical alignment layer, and may be formed of the same materials as the above-described first alignment layer 11.

Although the color filter 230 and the light blocking member 220 are positioned on the lower display panel 100 in examples of the present specification, the present invention is not limited thereto. In alternative exemplary embodiments, the color filter 230 and the light blocking member 220 may be positioned on the upper display panel 200, or either one of them may be positioned on the lower display panel 100 while the other may be positioned on the upper display panel 200.

The liquid crystal layer 3 may have negative dielectric anisotropy, and may include the liquid crystal composition having negative dielectric anisotropy as described above. The liquid crystal molecules 31 of the liquid crystal layer 3 are aligned so that major axes thereof are perpendicular to the surfaces of the two display panels 100 and 200 in the absence of an electric field.

Meanwhile, in an exemplary embodiment, the liquid crystal layer 3 of the liquid crystal display according to the present invention, may include compounds such as a monomer and the like, that are cured by polymerization using light such as ultraviolet ("UV") rays, or the like. The compound may be a reactive mesogen ("RM") performing the polymerization.

The reactive mesogen may perform the polymerization according to a manufacturing process to form a polymer, and the liquid crystal molecules 31 may be aligned to have a pre-tilt due to the polymer.

Next, referring to FIG. 4, the basic electrode 191 is described.

As shown in FIG. 4, the basic electrode 191 has an overall shape of a quadrangle, and includes a cross stem portion including a horizontal stem portion 193 and a vertical stem portion 192 orthogonal to the horizontal step portion. In addition, the basic electrode 191 includes a first sub-region (Da), a second sub-region (Db), a third sub-region (Dc), and a fourth sub-region (Dd) which are classified based on the horizontal stem portion 193 and the vertical stem portion 192. Each sub-region (Da to Dd) is positioned with a plurality of first fine branched portions 194a, a plurality of second fine branched portions 194b, a plurality of third fine branched portions 194c, and a plurality of fourth fine branched portions 194d.

The first fine branched portions 194a are obliquely extended in a left upper direction from the horizontal stem portion 193 or the vertical stem portion 192, and the second fine branched portions 194b are obliquely extended in a right upper direction from the horizontal stem portion 193 or the vertical stem portion 192. In addition, the third fine branched portions 194c are obliquely extended in a left lower direction from the horizontal stem portion 193 or the vertical stem portion 192, and the fourth fine branched portions 194d are obliquely extended in a right lower direction from the horizontal stem portion 193 or the vertical stem portion 192.

Here, edges of the first to fourth fine branched portions 194a, 194b, 194c, and 194d generate horizontal components determining the tilt direction of the liquid crystal molecules 31 by distorting an applied electric field. The horizontal components of the electric field are nearly horizontal to the edges of the first to fourth fine branched portions 194a, 194b, 194c, and 194d. Therefore, as shown in FIG. 4, the liquid crystal molecules 31 are tilted in a direction parallel to a length direction of the fine branched portions 194a, 194b, 194c, and 194d. Since one pixel electrode 191 includes four sub-regions (Da to Dd) in which length directions of the fine branched portions 194a, 194b, 194c, and 194d are different from each other, there are approximately four directions in which the liquid crystal molecules 31 are tilted, and as a result, four different regions each having different alignment directions of the liquid crystal molecules 31 are formed on the liquid crystal layer 3. When the direction in which the liquid crystal molecules are tilted is varied as described above, a reference viewing angle of the liquid crystal display is increased.

The above-described liquid crystal display has a circuit diagram shown in FIG. 5; hereinafter, the diagram is described. FIG. 5 is a circuit diagram of one pixel PX area of an exemplary embodiment of the liquid crystal display according to the present invention.

In an exemplary embodiment, the liquid crystal display according to the present invention includes a plurality of signal lines including a gate line GL transferring a gate signal, a data line DL transferring a data signal, and a divided reference voltage line RL transferring a divided reference voltage. First, second, and third switching elements Qa, Qb, and Qc are connected to the plurality of signal lines, and to the first and second liquid crystal capacitors C1ca and C1cb.

The first and second switching elements Qa and Qb are connected to the gate line GL and the data line DL, respectively, and the third switching element Qc is connected to an output terminal of the second switching element Qb and the divided reference voltage line RL.

The first switching element Qa and the second switching element Qb are three-terminal elements of the thin film transistor or the like. A control terminal thereof is connected to the gate line GL, an input terminal thereof is connected to the data line DL, an output terminal of the first switching element Qa is connected to the first liquid crystal capacitor C1ca, and an output terminal of the second switching element Qb is connected to the second liquid crystal capacitor C1cb and to an input terminal of the third switching element Qc.

The third switching element Qc is also a three-terminal element of the thin film transistor or the like. A control terminal is connected to the gate line GL, an input terminal thereof is connected to the second liquid crystal capacitor C1cb, and an output terminal is connected to the divided reference voltage line RL.

When a gate on signal is applied to the gate line GL, the first switching element Qa, the second switching element Qb, and the third switching element Qc connected thereto are turned on. Consequently, the data voltage applied to the data line DL is applied to the first sub-pixel electrode PEa and the second sub-pixel electrode PEb through the first switching element Qa and the second switching element Qb which are turned on. Here, the data voltages applied to the first sub-pixel electrode PEa and the second sub-pixel electrode PEb are the same, and the first liquid crystal capacitor C1ca and the second liquid crystal capacitor C1cb are charged by the same value of as much as a difference between the common voltage and the data voltage. Simultaneously, the voltage charged into the second liquid crystal capacitor C1cb is divided by the turned on third switching element Qc. Consequently, the voltage value charged into the second liquid crystal capacitor C1cb is reduced by the difference between the common voltage and the divided reference voltage. That is, the voltage charged into the first liquid crystal capacitor C1ca is higher than the voltage charged into the second liquid crystal capacitor C1cb.

As described above, the voltage charged into the first liquid crystal capacitor C1ca is different from the voltage charged into the second liquid crystal capacitor C1cb. Since the voltage of the first liquid crystal capacitor C1ca is different from that of the second liquid crystal capacitor C1cb, angles at which the liquid crystal molecules are tilted in the first sub-pixel and the second sub-pixel are different from each other, and therefore the luminance of the two sub-pixels are different from each other. Therefore, when the voltage of the first liquid crystal capacitor C1ca and the voltage of the second liquid crystal capacitor C1cb are appropriately controlled, an image at a side is allowed to be maximally close to an image at the front, and therefore side visibility may be improved.

Although the third switching element Qc connected to the second liquid crystal capacitor C1cb and the divided reference voltage line RL is shown as an exemplary embodiment in the drawings in order to make the voltage charged into the first liquid crystal capacitor C1ca differ from the voltage charged into the second liquid crystal capacitor C1cb, the invention is not limited thereto. In other exemplary embodiments of a liquid crystal display according to the present invention, the second liquid crystal capacitor C1cb may be connected to a step-down capacitor.

Specifically, the third switching element including the first terminal connected to a step-down gate line, the second terminal connected to the second liquid crystal capacitor C1cb, and the third terminal connected to the step-down capacitor is included to allow a portion of an electrical charge amount charged into the second liquid crystal capacitor C1cb to be charged into the step-down capacitor, such that the charging voltages of the first liquid crystal capacitor C1ca and the second liquid crystal capacitor C1cb may be set differently. In addition, in another exemplary embodiment of a liquid crystal display according to the present invention, the first liquid crystal capacitor C1ca and the second liquid crystal capacitor C1cb are connected to different data lines, respectively, to thereby allow different data voltages to be received, such that the charging voltages of the first liquid crystal capacitor C1ca and the second liquid crystal capacitor C1cb may be set differently.

Moreover, the charging voltages of the first liquid crystal capacitor C1ca and the second liquid crystal capacitor C1cb may be set differently by various other methods.

Although the circuit diagram of one pixel area is shown with reference to FIG. 5, the present invention is not limited thereto, and may have various alternative circuit diagrams.

The above-described liquid crystal display may include a liquid crystal composition having negative dielectric anisotropy, and may include the liquid crystal composition having negative dielectric anisotropy and including a 1,3-dioxane group or a tetrahydropyran group, thereby obtaining a high-speed response characteristic. In addition, alkenyl compounds having a problem in which reliability is deteriorated, may be substituted with the exemplary liquid crystal composition according to the present invention, thereby preventing the reliability of the liquid crystal display from being deteriorated.

Hereinafter, another exemplary embodiment of the liquid crystal composition forming the liquid crystal layer 3 positioned between the lower display panel 100 and the upper display panel 200, is described.

In an exemplary embodiment, the liquid crystal composition according to the present invention may include a first class liquid crystal compound including a neutral liquid crystal compound and a second class liquid crystal compound including a polar liquid crystal compound.

Here, the first class liquid crystal compound may include one or more compounds represented by the following Chemical Formulas 1 to 8.

Chemical Formula 1

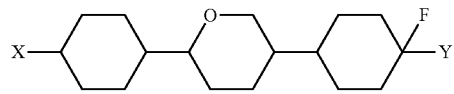

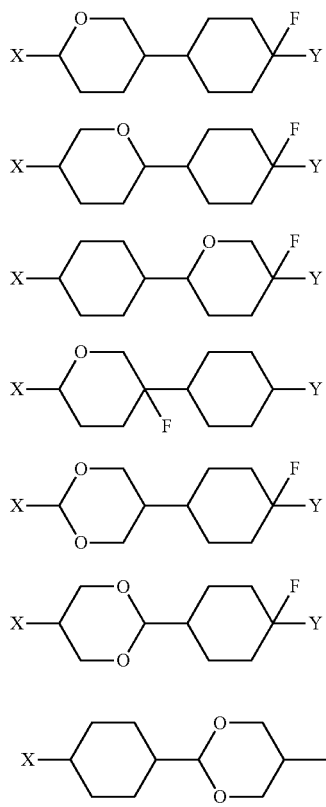

Chemical Formula 2

Chemical Formula 3

Chemical Formula 4

Chemical Formula 5

Chemical Formula 6

Chemical Formula 7

Chemical Formula 8

In the Chemical Formulas 1 to 8, X and Y are each independently a $C_1$-$C_7$ alkyl group. The compound represented by Chemical Formulas 1 to 5 are neutral liquid crystal compounds including tetrahydropyran, and the compound represented by Chemical Formulas 6 to 8 are neutral liquid crystal compounds including 1,3-dioxane.

In the compounds represented by Chemical Formula 1, the refractive index ($\Delta n$) is about 0.06 and the dielectric anisotropy ($\Delta \in$) is about −1.0. In the compounds represented by Chemical Formula 2, the refractive index ($\Delta n$) is about 0.03 and the dielectric anisotropy ($\Delta \in$) is about 0.8. In the compounds represented by Chemical Formula 3, the refractive index ($\Delta n$) is about 0.03 and the dielectric anisotropy ($\Delta \in$) is about 0.8. In the compounds represented by Chemical Formula 4, the refractive index ($\Delta n$) is about 0.03 and the dielectric anisotropy ($\Delta \in$) is about 2.3. In the compounds represented by Chemical Formula 5, the refractive index ($\Delta n$) is about 0.03 and the dielectric anisotropy ($\Delta \in$) is about 2.2. In the compounds represented by Chemical Formula 6, the refractive index ($\Delta n$) is about 0.03 and the dielectric anisotropy ($\Delta \in$) is about 2.2. In the compounds represented by Chemical Formula 7, the refractive index ($\Delta n$) is about 0.03 and the dielectric anisotropy ($\Delta \in$) is about 1.5. In the compounds represented by Chemical Formula 8, the refractive index ($\Delta n$) is about 0.03 and the dielectric anisotropy ($\Delta \in$) is about −1.0.

The first class liquid crystal compound may be included in the liquid crystal composition in amounts of about 2 wt % to about 20 wt % based on the total weight of the liquid crystal composition.

In exemplary embodiments, the liquid crystal composition according to the present invention may further include one or more compounds represented by the following Chemical Formulas 27 to 33.

Chemical Formula 27

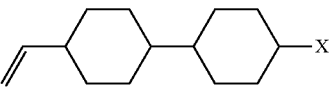

Chemical Formula 28

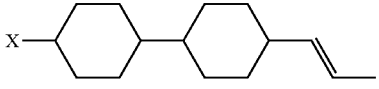

Chemical Formula 29

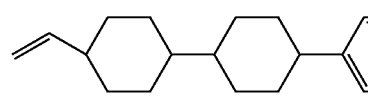

Chemical Formula 30

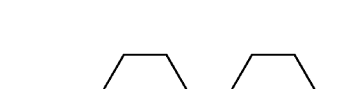

Chemical Formula 31

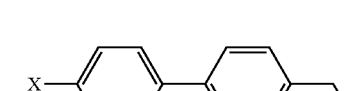

Chemical Formula 32

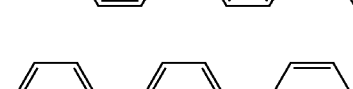

Chemical Formula 33

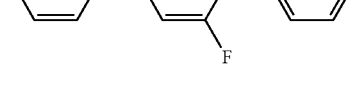

In the Chemical Formulas 27 to 33, X and Y are each independently a C1-C7 alkyl group. Here, the compounds represented by Chemical Formulas 27 to 33 may be included in an amount of about 35 wt % to about 70 wt % based on the total weight of the liquid crystal composition.

In other exemplary embodiments according to the present invention, the first class liquid crystal compound including the neutral liquid crystal compound may further include one or more compounds represented by the following Chemical Formulas 34 to 38.

Chemical Formula 34

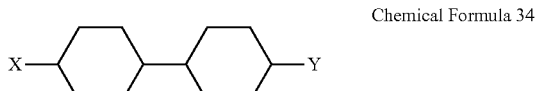

Chemical Formula 35

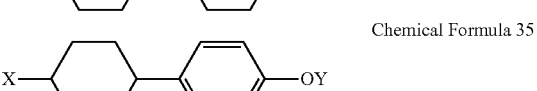

Chemical Formula 36

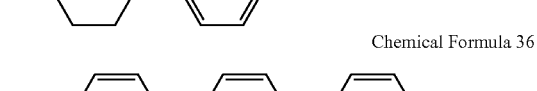

Chemical Formula 37

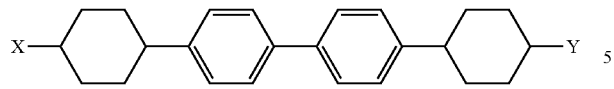

Chemical Formula 38

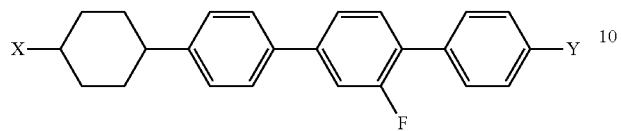

In the Chemical Formulas 34 to 38, X and Y are each independently a C1-C7 alkyl group. Here, the compounds represented by Chemical Formulas 34 to 38 may be included in amount of about 2 wt % to about 20 wt % based on the entire content of the liquid crystal composition.

In exemplary embodiments, the second class liquid crystal compound including the polar liquid crystal compound according to the present invention may further include one or more compounds represented by the following Chemical Formulas 39 to 49.

Chemical Formula 39

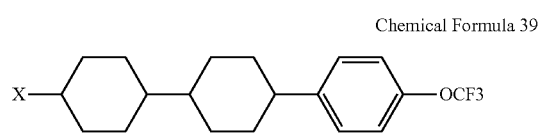

Chemical Formula 40

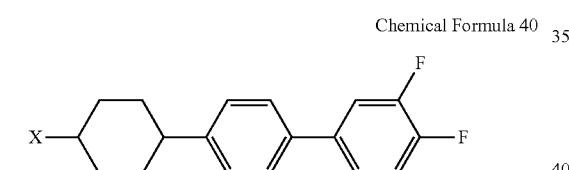

Chemical Formula 41

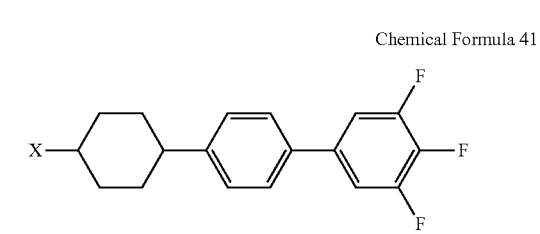

Chemical Formula 42

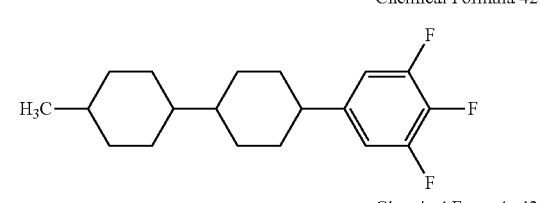

Chemical Formula 43

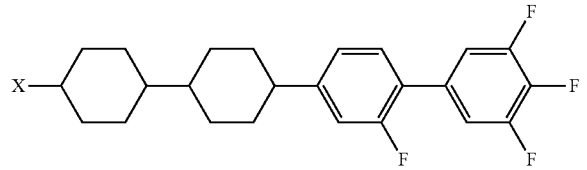

Chemical Formula 44

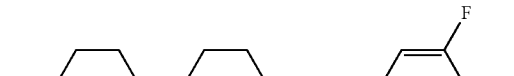

Chemical Formula 45

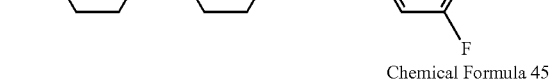

Chemical Formula 46

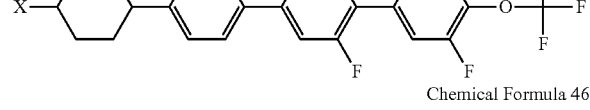

Chemical Formula 47

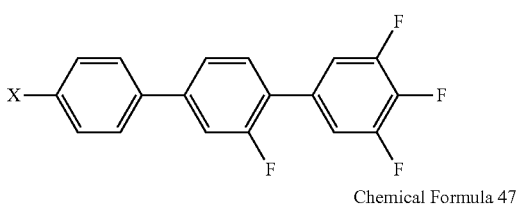

Chemical Formula 48

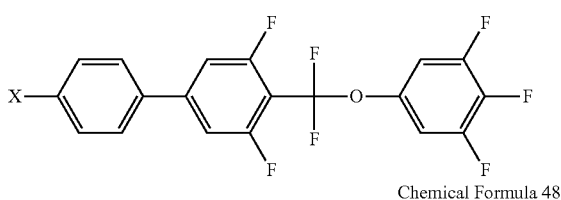

Chemical Formula 49

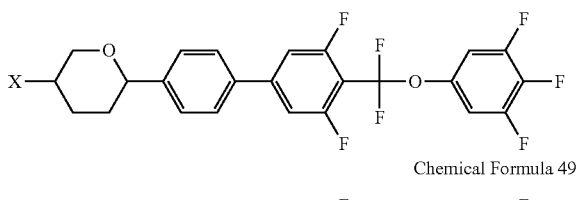

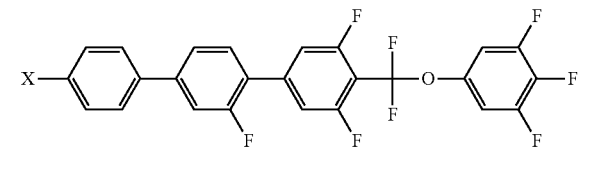

In Chemical Formulas 39 to 49, X and Y are each independently a C1-C7 alkyl group. Here, the compounds represented by Chemical Formulas 39 to 49 may be included in an amount of about 18 wt % to about 50 wt % based on the total weight of the liquid crystal composition.

The liquid crystal composition including the first class and second class liquid crystal compounds as described above may have a dielectric anisotropy (Δ∈) of about 5 to about 17, a refractive index (Δn) of about 0.08 to about 0.15, and a rotational viscosity (γ1) of about 50 to about 100. That is, in exemplary embodiments, the liquid crystal composition according to the present invention may have positive dielectric anisotropy.

The above-described liquid crystal composition including a neutral liquid crystal compound including a 1,3-dioxane group or a tetrahydropyran group, may demonstrate improved reliability and response speed of the panels.

Figure 6:
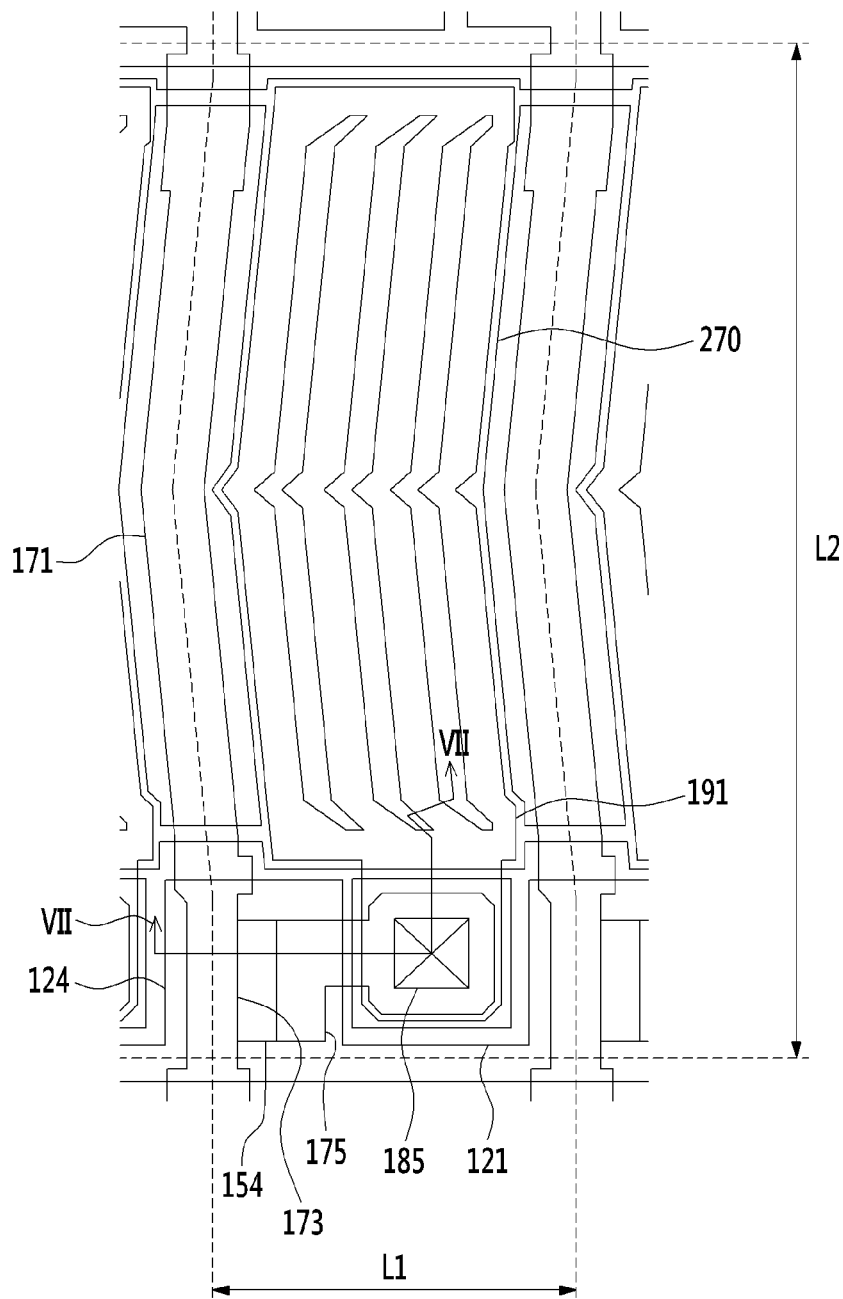
FIG. 6 is a plan view of one pixel area of an exemplary embodiment of the liquid crystal display according to the present invention.
Figure 7:
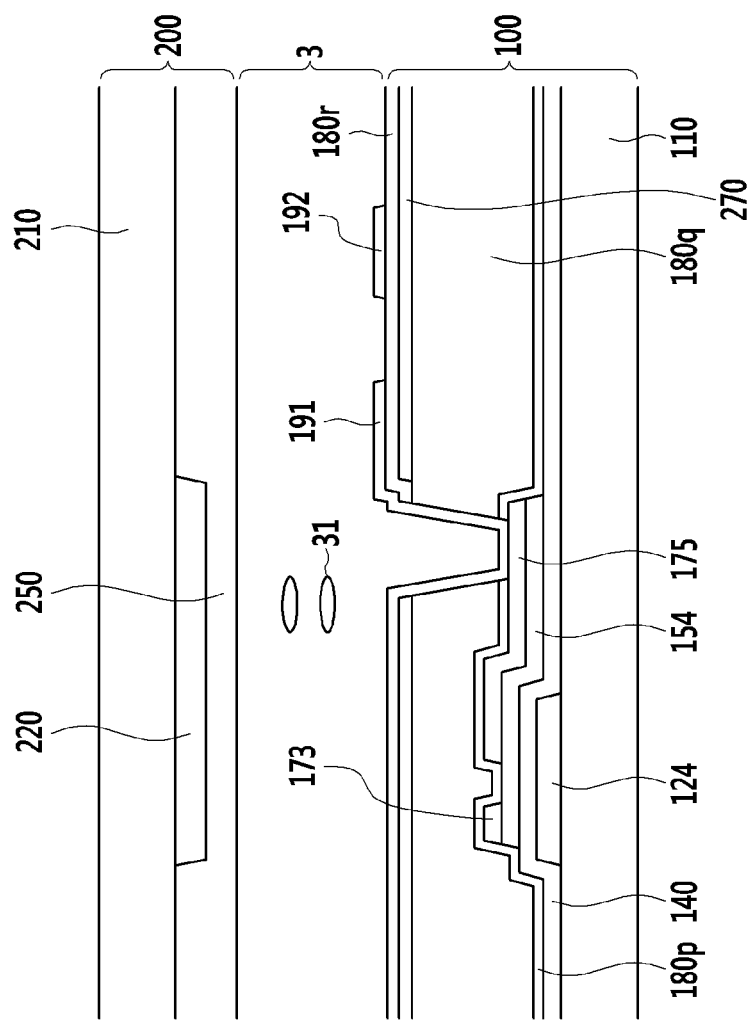
FIG. 7 is a cross-sectional view of an exemplary embodiment of one pixel area taken along line VII-VII in FIG. 6.

The liquid crystal display including the liquid crystal composition having the positive dielectric anisotropy as described above will now be described with reference to FIGS. 6 and 7. FIG. 6 is a plan view of a portion of a pixel area of an exemplary embodiment of the liquid crystal display according to the present invention. FIG. 7 is a cross-sectional view of the pixel area taken along line VII-VII in FIG. 6. FIG. 7 also provides a cross-sectional view of the contact hole of a gate driver of the exemplary liquid crystal display.

In a thin film transistor array panel of an exemplary embodiment of the liquid crystal display according the present invention, the gate line 121 including the gate electrode 124 is positioned on the first insulation substrate 110 formed of transparent glass, plastic, or the like.

The gate electrode 124 may be formed of aluminum-based metals such as aluminum (Al), an aluminum alloy, and the like, silver-based metals such as silver (Ag), a silver alloy, and the like, copper-based metals such as copper (Cu), a copper alloy, and the like, molybdenum-based metals such as molybdenum (Mo), a molybdenum alloy, and the like, chromium (Cr), tantalum (Ta), titanium (Ti), and the like.

The gate insulating layer 140 formed of a silicon nitride (SiNx) and/or a silicon oxide (SiOx), and the like, is positioned on the gate electrode 124. The gate insulating layer 140 may have a multilayer structure including at least two insulating layers having different physical properties.

The semiconductor layer 154 is positioned on the gate insulating layer 140, and the data line 171 including the source electrode 173 and the drain electrode 175, is positioned on the semiconductor layer 154 and the gate insulating layer 140.

The date line 171 includes the wide end portion (not shown) for allowing a connection with other layers or external driving circuits. The data line 171 transmits a data signal, is mainly extended in a vertical direction, and intersects the gate line 121.

Here, the data line 171 may have a first flexure portion having a bent shape in order to obtain maximum transmittance of the liquid crystal display, and the flexure portion may be bent at a middle region of the pixel area to form a V shape. The middle region of the pixel area may further include a second flexure portion which is bent to achieve a predetermined angle with the first flexure portion.

The source electrode 173 is a portion of the data line 171, and is disposed on the same line as the data line 171. The drain electrode 175 is extended so as to be parallel to the source electrode 173. Therefore, the drain electrode 175 is parallel to a portion of the data line 171.

The gate electrode 124, the source electrode 173, and the drain electrode 175 together with the semiconductor layer 154, form one thin film transistor (TFT), and the channel of the thin film transistor is formed on the semiconductor layer 154 between the source electrode 173 and the drain electrode 175.

In an exemplary embodiment, the liquid crystal display according to the present invention may include the drain electrode 175 extended in parallel to the source electrode 173 which is positioned on the same line as the data line 171, and extended in parallel to the data line 171. This configuration allows a width of the thin film transistor to be widened without widening the area occupied by the data conductor, and therefore, an aperture ratio of the liquid crystal display may be increased.

The data conductor including the data line 171 is preferably formed of a refractory metals such as molybdenum, chromium, tantalum, titanium, and the like, or alloys thereof. The data conductor may have a multilayer structure (not shown) including a refractory metal layer and a low-resistance conductive layer.

Examples of the multilayer structure may include a bi-layer having a chromium or molybdenum (alloy) lower layer and an aluminum (alloy) upper layer, and a triple-layer having a molybdenum (alloy) lower layer, an aluminum (alloy) intermediate layer, and a molybdenum (alloy) upper layer. However, the data line 171 and the drain electrode 175 may be formed of various metals or conductors in addition to the above-described materials.

The first passivation layer 180*p* is disposed on the exposed portions of the data conductors 171, 173 and 175, the gate insulating layer 140, and the semiconductor layer 154. The first passivation layer 180*p* may be formed of organic insulating materials, inorganic insulating materials, a combination thereof, or the like.

The second passivation layer 180*q* is positioned on the first passivation layer 180*p*. The second passivation layer 180*q* may optionally be omitted.

The second passivation layer 180*q* may be the color filter. When the second passivation layer 180*q* is the color filter, the second passivation layer 180*q* may uniquely exhibit one of the primary colors. Examples of the primary colors include three primary colors such as red, green, blue, and the like, or yellow, cyan, magenta, and the like. Although not shown, the color filter may further include a color filter exhibiting a mixed color of the primary colors or white in addition to the primary colors.

The common electrode 270 is positioned on the second passivation layer 180*q*. The common electrode 270 has a planar form, it may be formed in a strip on a front surface of the substrate 110, and it may have an opening (not shown) disposed in a region corresponding to periphery of the drain electrode 175. That is, the common electrode 270 may have a flat plate shape.

Common electrodes 270 positioned on adjacent pixels may be connected to each other to receive a common voltage having a predetermined size supplied from the outside of the display area.

A third passivation layer 180*r* is disposed on the common electrode 270. The third passivation layer 180*r* may be formed of organic insulating materials, inorganic insulating materials, a combination thereof, or the like.

The pixel electrode 191 is positioned on the third passivation layer 180*r*. The pixel electrode 191 includes curved edges nearly parallel to the first flexure portion and the second flexure portion of the data line 171. The pixel electrode 191 has a plurality of cutouts and includes a plurality of slits defined by the plurality of cutouts.

A contact hole 185 exposing the drain electrode 175 is formed in the first passivation layer 180*p*, the second passivation layer 180*q*, and the third passivation layer 180*r*. The pixel electrode 191 is physically and electrically connected to the drain electrode 175 through the contact hole 185 to thereby receive a voltage applied from the drain electrode 175.

Although not shown, an alignment layer is coated on the pixel electrode 191 and the third passivation layer 180*r*. The alignment layer may be a horizontal alignment layer, and may be rubbed in a predetermined direction.

Now, the upper display panel 200 is described.

The light blocking member 220 is positioned on the insulation substrate 210, and a flat layer 250 is positioned on the light blocking member 220.

In another exemplary embodiment of the present invention, the color filter is positioned on the lower display panel, and the light blocking member 220 is positioned on the upper display panel; however, the present invention is not limited thereto. That is, both of the color filter and the light blocking member may be positioned on the lower display panel, both of the color filter and the light blocking member may be positioned on the upper display panel, or positions of the color filter and the light blocking member may be changed.

In another exemplary embodiment, the liquid crystal layer 3 according to the present invention may have positive dielectric anisotropy, and specifically, may include the liquid crystal composition having positive dielectric anisotropy as described above. The liquid crystal molecules 31 of the liquid crystal layer 3 may be aligned so that major axes thereof are perpendicular to the surface of the two display panels 100 and 200 in a state without an electric field.

In an exemplary embodiment, the pixel electrode 191 is positioned on the common electrode 270, however, the present invention is not limited thereto, and therefore it is possible in another exemplary embodiment, for the common electrode 270 to be positioned on the pixel electrode 191.

The above-described liquid crystal display may include the liquid crystal composition having positive dielectric anisotropy and including a 1,3-dioxane group or a tetrahydropyran group, thereby obtaining a high-speed response characteristic. In addition, the liquid crystal display includes the liquid crystal composition from which the problem of reliability being deteriorated by a radical reaction and the like is removed, thereby preventing reliability from being deteriorated.

Hereinafter, in an exemplary embodiment, the liquid crystal composition according of the present invention and physical properties thereof, are described.

Example 1, shown below in Table 1, is an exemplary embodiment including compounds represented by Chemical Formulas 3, 7, and 10.

TABLE 1

| Liquid Crystal Compound | Content (wt %) |
|---|---|
| | 15 |
| | 9 |
| | 8 |
| | 7.5 |
| | 7 |
| | 16 |
| | 10 |
| | 8 |

TABLE 1-continued

| Liquid Crystal Compound | Content (wt %) |
|---|---|
| 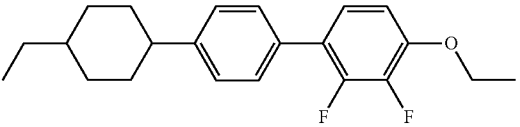 [SMILES: CCOc1ccc(-c2ccc(C3CCC(CC)CC3)cc2)c(F)c1F] | 3 |
| 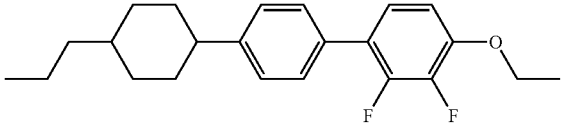 [SMILES: CCCC1CCC(c2ccc(-c3ccc(OCC)c(F)c3F)cc2)CC1] | 8.5 |
| 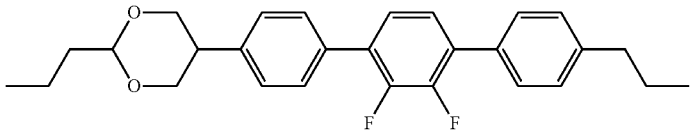 [SMILES: CCCc1ccc(-c2ccc(-c3ccc(C4COC(CCC)OC4)cc3)c(F)c2F)cc1] | 8 |

As a result obtained by evaluating physical properties thereof, the refractive index (Δn) was about 0.109, the dielectric anisotropy (Δ∈) was about −3.3, and the rotational viscosity γ1 was about 106. This shows that the liquid crystal composition including Chemical Formulas 3, 7, and 10, and having decreased amounts of Chemical Formulas 14 and 15, which are the liquid crystal compounds according to an exemplary embodiment of the present invention satisfies physical properties required for the liquid crystal display.

Example 2 shown in Table 2 below is an exemplary embodiment including compounds represented by Chemical Formulas 3 and 7.

TABLE 2

| Liquid Crystal Compound | Content (wt %) |
|---|---|
| 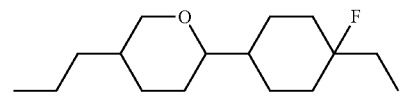 [SMILES: CCCC1CCC(C2CCC(F)(CC)CC2)OC1] | 22 |
| 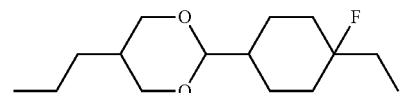 | 9 |
| 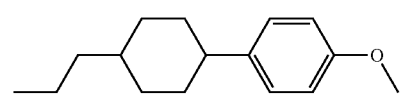 | 7 |
| 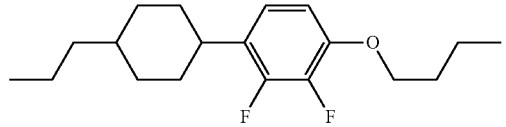 | 15 |
| 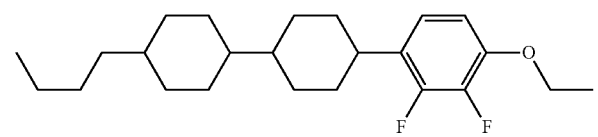 | 9.5 |
| 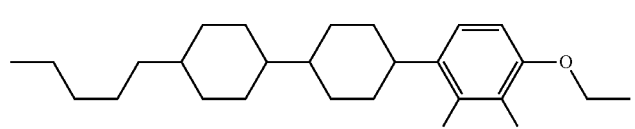 | 5 |

TABLE 2-continued

| Liquid Crystal Compound | Content (wt %) |
|---|---|
| 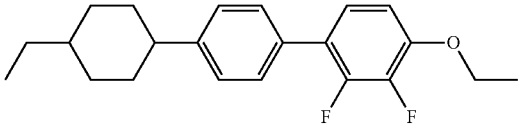 [SMILES: CCOc1ccc(-c2ccc(C3CCC(CC)CC3)cc2)c(F)c1F] | 9 |
| 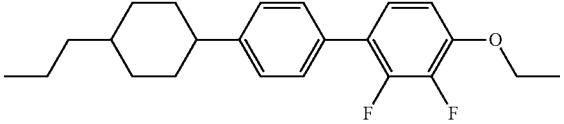 | 9 |
| 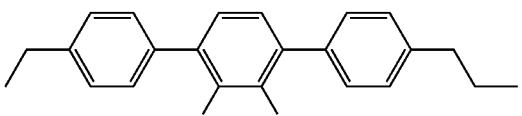 | 7 |
| 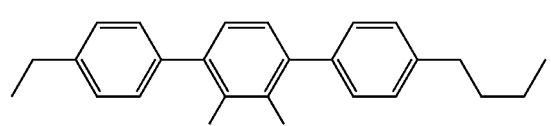 | 7.5 |

As a result obtained by evaluating physical properties thereof, the refractive index (Δn) was about 0.109, the dielectric anisotropy (Δ∈) was about −3.0, and the rotational viscosity (γ1) was about 114. It was confirmed that Example 2 was a liquid crystal composition without including Chemical Formulas 14 to 16, and this composition had physical properties required for the liquid crystal display.

Example 3 shown below in Table 3, is an exemplary embodiment including compounds represented by Chemical Formulas 3, 7, and 10.

TABLE 3

| Liquid Crystal Compound | Content (wt %) |
|---|---|
| 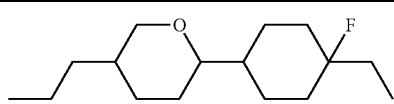 | 22 |
| 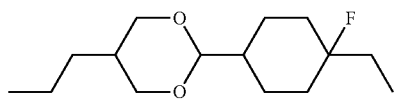 [SMILES: CCCC1COC(C2CCC(F)(CC)CC2)OC1] | 9 |
| 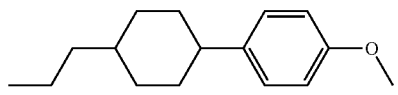 [SMILES: CCCC1CCC(c2ccc(OC)cc2)CC1] | 7 |
| 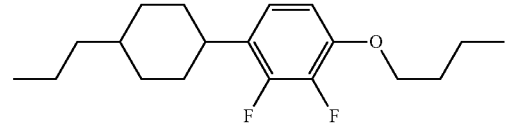 [SMILES: CCCCOc1ccc(C2CCC(CCC)CC2)c(F)c1F] | 15 |
| 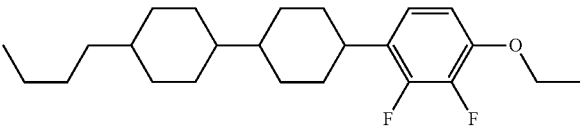 [SMILES: CCCCC1CCC(C2CCC(c3ccc(OCC)c(F)c3F)CC2)CC1] | 9.5 |

TABLE 3-continued

| Liquid Crystal Compound | Content (wt %) |
|---|---|
| [structure] | 5 |
| [structure] | 9 |
| [structure] | 9 |
| [structure] | 14.5 |

As a result obtained by evaluating physical properties thereof, the refractive index (Δn) was about 0.112, the dielectric anisotropy (Δ∈) was about −3.1, and the rotational viscosity (γ1) was about 117. It was thus confirmed that Example 3 was a liquid crystal composition without including Chemical Formulas 14 to 16, and the liquid crystal composition had physical properties required for the liquid crystal display.

Example 4 shown in Table 4 below, is an exemplary embodiment including compounds represented by Chemical Formulas 3, 7, and 10.

TABLE 4

| Liquid Crystal Compound | Content (wt %) |
|---|---|
| [structure] | 20 |
| [structure] | 8 |
| [structure] | 6.5 |
| [structure] | 7 |
| [structure] | 3.5 |

TABLE 4-continued

| Liquid Crystal Compound | Content (wt %) |
|---|---|
| [structure] | 7.5 |
| [structure] | 11 |
| [structure] | 11 |
| [structure] | 8.5 |
| [structure] | 12 |
| [structure] | 5 |

As a result obtained by evaluating physical properties thereof, the refractive index (Δn) was about 0.107, the dielectric anisotropy (Δ∈) was about −5.1, and the rotational viscosity (γ1) was about 140. That is, it was confirmed that Example 4 was a liquid crystal composition having negative dielectric anisotropy, and particularly, having high dielectric constant.

Example 5 shown below in Table 5, is an exemplary embodiment including compounds represented by Chemical Formulas 3 and 7.

TABLE 5

| Liquid Crystal Compound | Content (wt %) |
|---|---|
| [structure] | 17 |
| [structure] | 7 |
| [structure] | 8 |

TABLE 5-continued

| Liquid Crystal Compound | Content (wt %) |
|---|---|
| (structure) | 7 |
| (structure) | 12 |
| (structure) | 4 |
| (structure) | 6.5 |
| (structure) | 5 |
| (structure) | 3 |
| (structure) | 10.5 |
| (structure) | 5 |

TABLE 5-continued

| Liquid Crystal Compound | Content (wt %) |
|---|---|
| [structure: propyl-biphenyl-(2,3-difluoro)phenyl-(3,5-difluoro)phenyl with -CF$_2$O- linker to (3,4,5-trifluoro)phenyl] | 7 |
| [structure: butyl-biphenyl-(2-fluoro)phenyl-(3,5-difluoro)phenyl with -CF$_2$O- linker to (3,4,5-trifluoro)phenyl] | 8 |

As a result obtained by evaluating physical properties thereof, the refractive index (Δn) was about 0.145, the dielectric anisotropy (Δ∈) was about 17.8, and the rotational viscosity (γ1) was about 97. That is, it was confirmed that Example 5 was a liquid crystal composition having positive dielectric anisotropy, and even in the case of including the liquid crystal compound according to an exemplary embodiment, predetermined physical properties required for the liquid crystal display were shown.

Comparative Example 1 is shown in Table 6 below, and includes the compounds of Chemical Formulas A-1 to A-9.

TABLE 6

| Liquid Crystal Compound | Chemical Formula |
|---|---|
| [propyl-dicyclohexyl-vinyl] | A-1 |
| [propyl-dicyclohexyl-propenyl] | A-2 |
| [propyl-cyclohexyl-(2,3-difluoro)phenyl-O-butyl] | A-3 |
| [butyl-cyclohexyl-(2,3-difluoro)phenyl-O-ethyl] | A-4 |
| [propyl-dicyclohexyl-(2,3-difluoro)phenyl-O-ethyl] | A-5 |
| [ethyl-cyclohexyl-phenyl-(2,3-difluoro)phenyl-O-ethyl] | A-6 |

TABLE 6-continued

| Liquid Crystal Compound | Chemical Formula |
|---|---|
| 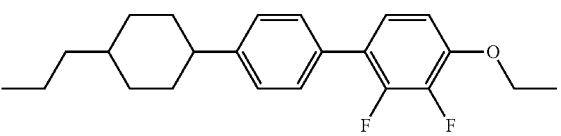 [SMILES: CCCC1CCC(c2ccc(-c3ccc(OCC)c(F)c3F)cc2)CC1] | A-7 |
| 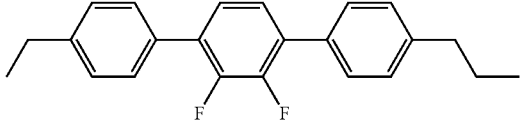 [SMILES: CCCc1ccc(-c2ccc(-c3ccc(CC)cc3)c(F)c2F)cc1] | A-8 |
| 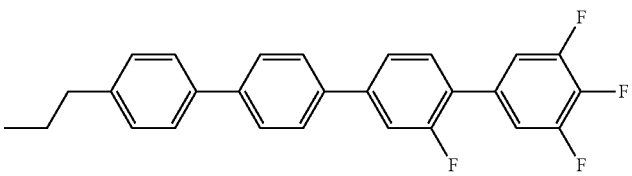 [SMILES: CCCc1ccc(-c2ccc(-c3ccc(-c4cc(F)c(F)c(F)c4)c(F)c3)cc2)cc1] | A-9 |

Comparative Example 1 did not include the exemplary liquid crystal composition disclosed in the present invention, but rather, included compounds of Chemical Formulas A-1 to A-9. As a result obtained by evaluating physical properties on the Comparative Example 1, the refractive index (Δn) was about 0.108, the dielectric anisotropy (Δ∈) was about −3.0, and the rotational viscosity (γ1) was about 97.

Figure 8:
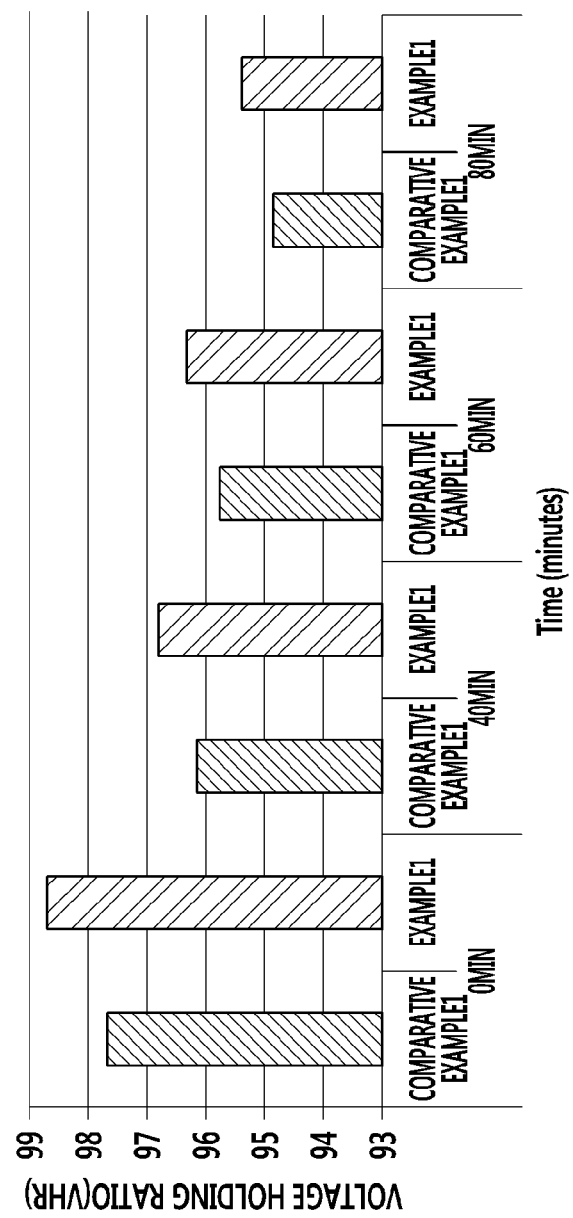
FIG. 8 is a graph illustrating the voltage holding ratio ("VHR") versus time (minutes) in accordance with Example 1 and Comparative Example 1.
Figure 9:
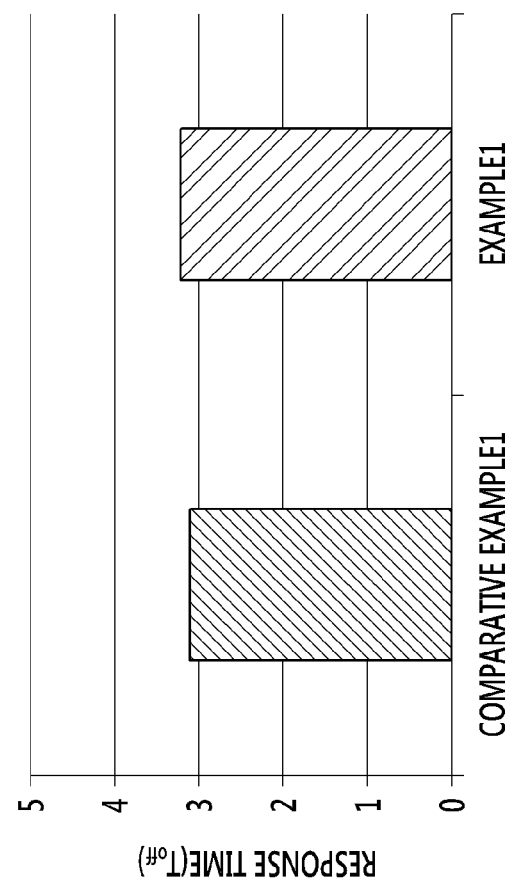
FIG. 9 is a graph illustrating the response time ($T_{off}$) of Example 1 and Comparative Example 1.

Hereinafter, the physical properties of Exemplary 1 and Comparative Example 1 are compared with reference to FIGS. 8 and 9. FIG. 8 is a graph of the voltage holding ratio (VHR) versus time (minutes) for Example 1 and Comparative Example 1, and FIG. 9 is a graph of a response time of Example 1 and Comparative Example 1.

First, referring to FIG. 8 and Table 7 below, UV was examined and VHR as time passed was considered, for Example 1 and Comparative Example 1.

TABLE 7

| Time (min) | Comparative Example 1 | Example 1 |
|---|---|---|
| 0 | 97.67 | 98.66 |
| 40 | 96.13 | 96.78 |
| 60 | 95.72 | 96.31 |
| 80 | 94.81 | 95.34 |

According to the results above, after a time period of 0 min, 40 min, 60 min, and 80 min, the VHR was decreased for both Comparative Example 1 and Example 1. However, it could be appreciated that the VHR of the liquid crystal composition according to Example 1 was higher than the VHR of Comparative Example 1 at all of the times tested. That is, it could be appreciated that the liquid crystal composition including the exemplary liquid crystal compounds according to the present invention, demonstrated improved reliability as shown by a higher VHR.

Then, referring to Equation 1, the response characteristic ($\tau_{off}$) of the liquid crystals is influenced by physical properties of the liquid crystals, particularly, $\gamma_1/K_{eff}$. That is, in a liquid crystal display having the same cell gap, the response characteristics depend on the physical properties of the liquid crystal.

$$\tau_{off} \propto \frac{\gamma_1}{\Delta n^2} \frac{1}{K_{eff}} \qquad \text{[Equation 1]}$$

The $\gamma_1/K_{eff}$ of Comparative Example 1 was about 6.18, and $\gamma_1/K_{eff}$ of Example 1 was about 6.58. As a result obtained by being applied to a predetermined liquid crystal display having the same cell gap, as shown in FIG. 9, it was confirmed that Comparative Example 1 showed a response speed ($T_{off}$) of about 3.11 milliseconds (ms), and Example 1 showed a response speed of about 3.20 ms.

That is, it could be appreciated that the liquid crystal layer including the exemplary liquid crystal composition according to the present invention, showed an improved response characteristic.

In summary, it was confirmed from the above-described Examples 1 to 5 that the exemplary liquid crystal compositions including the liquid crystal compounds according to the present invention, had the liquid crystal physical properties required for the liquid crystal display. In addition, since the exemplary liquid crystal compositions are capable of controlling the radical reactions (and the like) which are caused by other liquid crystal compositions, the present invention provides a liquid crystal composition having improved panel reliability.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal composition comprising:
   a first class liquid crystal compound; and
   a second class liquid crystal compound,
   wherein the first class liquid crystal compound comprises one or more compounds represented by following Chemical Formulas 1 to 8:

Chemical Formula 1

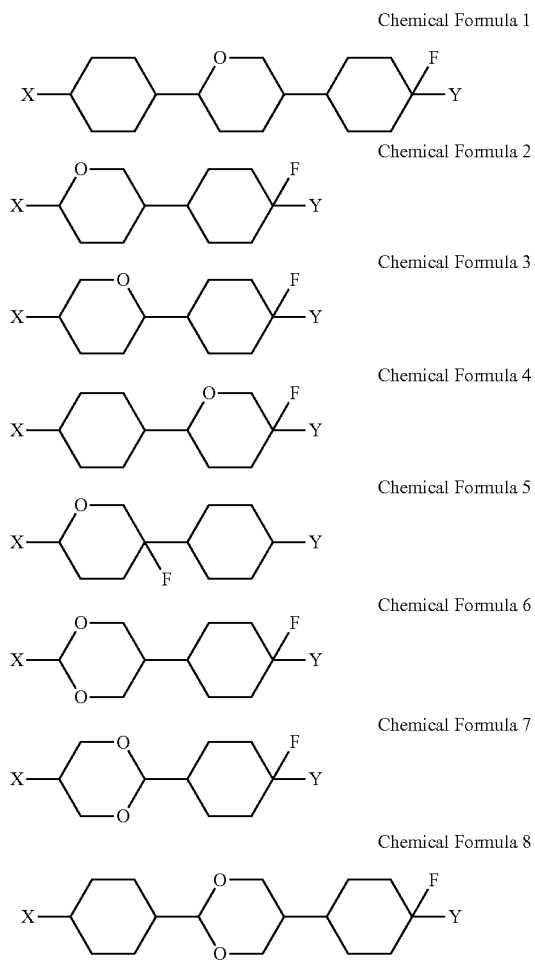

Chemical Formula 2

Chemical Formula 3

Chemical Formula 4

Chemical Formula 5

Chemical Formula 6

Chemical Formula 7

Chemical Formula 8 wherein, X and Y are independently a $C_1$-$C_7$ alkyl group.

2. The liquid crystal composition of claim 1, wherein the second class liquid crystal compound comprises one or more compounds represented by following Chemical Formulas 9 to 13:

Chemical Formula 9

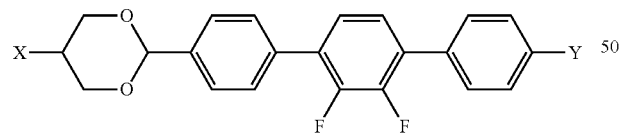

Chemical Formula 10

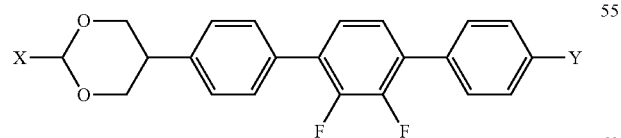

Chemical Formula 11

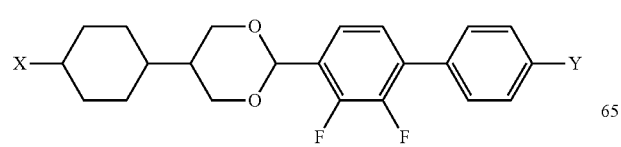

Chemical Formula 12

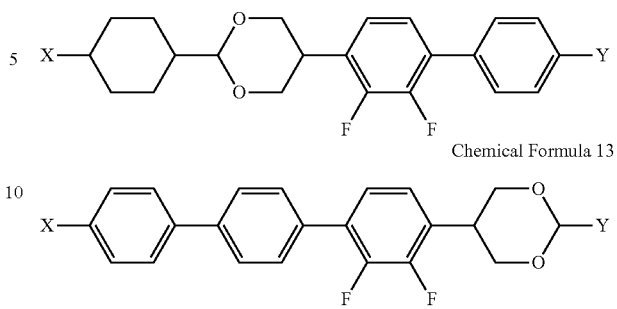

Chemical Formula 13

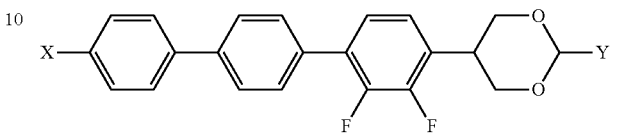

wherein, X and Y are independently a $C_1$-$C_7$ alkyl group.

3. The liquid crystal composition of claim 2, wherein the liquid crystal composition has a dielectric anisotropy (Δ∈) of about −5.5 to about −2.8.

4. The liquid crystal composition of claim 3, further comprising one or more compound represented by following Chemical Formulas 14 to 16:

Chemical Formula 14

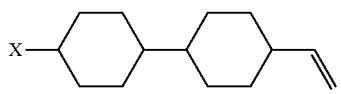

Chemical Formula 15

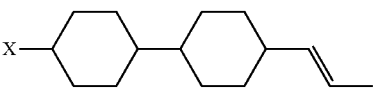

Chemical Formula 16

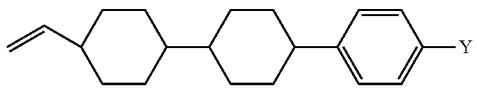

wherein, X and Y are independently a $C_1$-$C_7$ alkyl group.

5. The liquid crystal composition of claim 4, wherein the first class liquid crystal compound further comprises one or more compound represented by following Chemical Formulas 17 to 20:

Chemical Formula 17

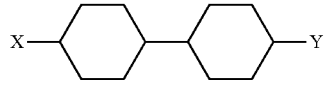

Chemical Formula 18

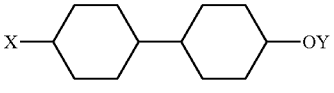

Chemical Formula 19

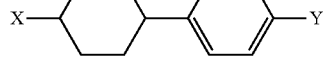

Chemical Formula 20

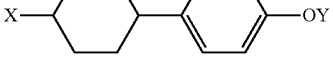

wherein, X and Y are independently a $C_1$-$C_7$ alkyl group.

6. The liquid crystal composition of claim 5, wherein the second class liquid crystal compound further comprises one or more compound represented by following Chemical Formulas 21 to 26:

Chemical Formula 21

Chemical Formula 22

Chemical Formula 23

Chemical Formula 24

Chemical Formula 25

Chemical Formula 26 wherein, X and Y are independently a $C_1$-$C_7$ alkyl group.

7. The liquid crystal composition of claim 2, wherein the liquid crystal composition has a refractive index (Δn) of about 0.08 to about 0.12.

8. The liquid crystal composition of claim 2, wherein the first class liquid crystal compound is present in an amount of about 10 wt % to about 45 wt %, based on a total weight of the liquid crystal composition.

9. The liquid crystal composition of claim 2, wherein the second class liquid crystal compound is present in an amount of about 5 wt % to about 15 wt %, based on a total weight of the liquid crystal composition.

10. The liquid crystal composition of claim 1, wherein the liquid crystal composition has a dielectric anisotropy (Δ∈) of about 5 to about 17, and a refractive index (Δn) of about 0.08 to about 0.15.

11. The liquid crystal composition of claim 10, wherein the first class liquid crystal compound is present in an amount of about 2 wt % to about 20 wt %, based on a total weight of the liquid crystal composition.

12. The liquid crystal composition of claim 11, further comprising one or more compounds represented by following Chemical Formulas 27 to 33:

Chemical Formula 27

Chemical Formula 28

Chemical Formula 29

Chemical Formula 30

Chemical Formula 31

Chemical Formula 32

Chemical Formula 33 wherein, X and Y are independently a $C_1$-$C_7$ alkyl group.

13. The liquid crystal composition of claim 12, wherein the first class liquid crystal compound further comprises one or more compound represented by following Chemical Formulas 34 to 38:

Chemical Formula 34

Chemical Formula 34

Chemical Formula 36

Chemical Formula 37

Chemical Formula 38

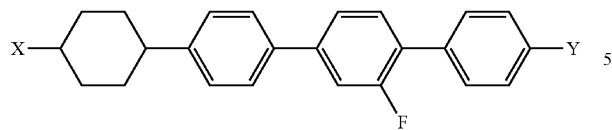

wherein, X and Y are independently a $C_1$-$C_7$ alkyl group.

14. The liquid crystal composition of claim 13, wherein the second class liquid crystal compound further comprises one or more compounds represented by following Chemical Formulas 39 to 49:

Chemical Formula 39

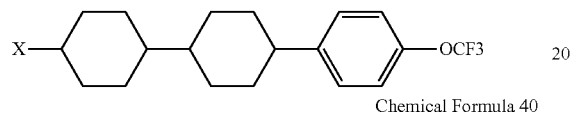

Chemical Formula 40

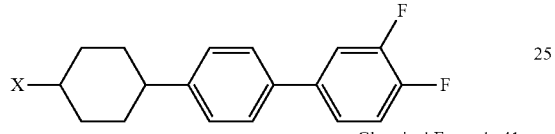

Chemical Formula 41

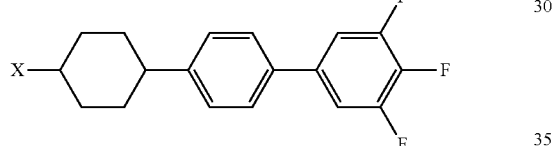

Chemical Formula 42

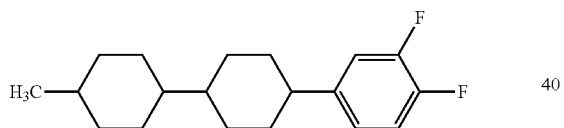

Chemical Formula 43

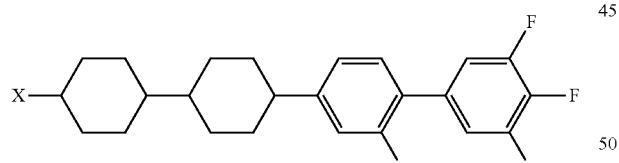

Chemical Formula 44

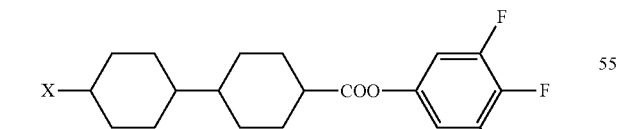

Chemical Formula 45

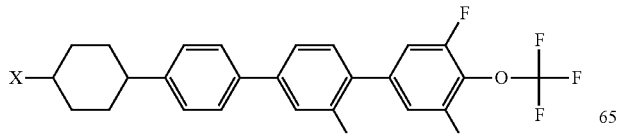

Chemical Formula 46

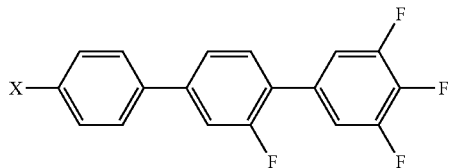

Chemical Formula 47

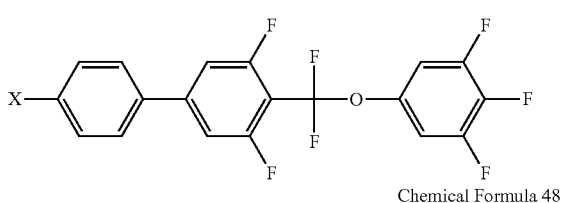

Chemical Formula 48

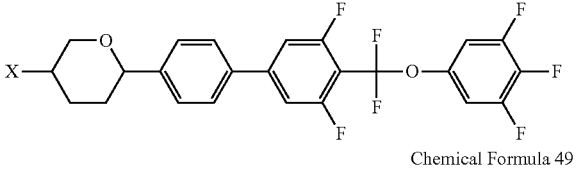

Chemical Formula 49

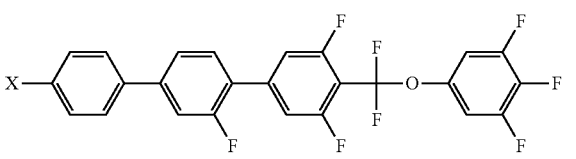

wherein, X and Y are independently a $C_1$-$C_7$ alkyl group.

15. A liquid crystal display comprising:
a first insulation substrate;
a thin film transistor on the first insulation substrate;
a pixel electrode connected to the thin film transistor;
a second insulation substrate facing the first insulation substrate;
a common electrode on the second insulation substrate; and
a liquid crystal layer between the common electrode and the pixel electrode,
wherein the liquid crystal layer comprises:
  a first class liquid crystal compound and
  a second class liquid crystal compound;
  wherein the first class liquid crystal compound comprises one or more compounds represented by following Chemical Formulas 1 to 8:

Chemical Formula 1

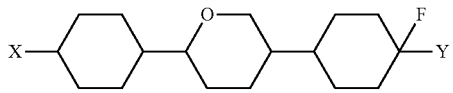

Chemical Formula 2

Chemical Formula 3

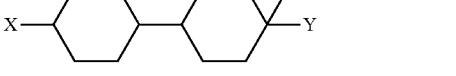

-continued

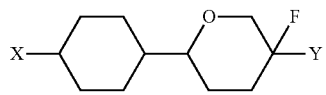
Chemical Formula 4

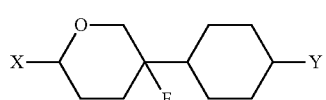
Chemical Formula 5

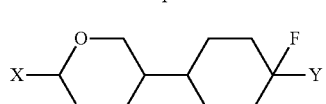
Chemical Formula 6

Chemical Formula 7

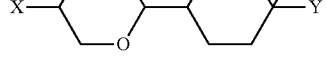
Chemical Formula 8

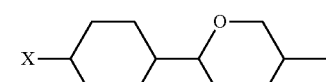

wherein, X and Y are independently a $C_1$-$C_7$ alkyl group.

16. The liquid crystal display of claim 15, wherein the second class liquid crystal compound comprises one or more compounds represented by following Chemical Formulas 9 to 13:

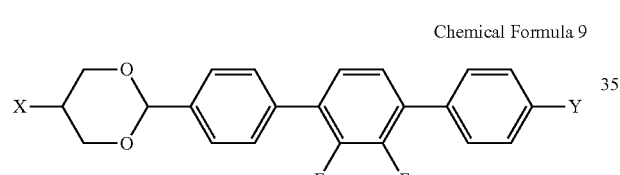
Chemical Formula 9

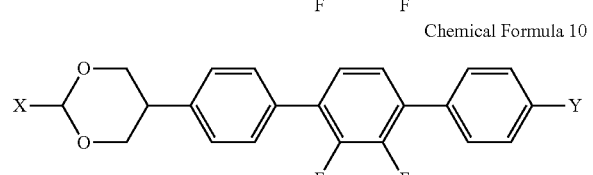
Chemical Formula 10

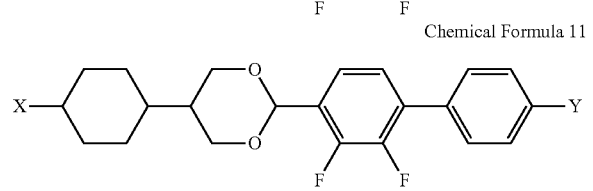
Chemical Formula 11

Chemical Formula 12

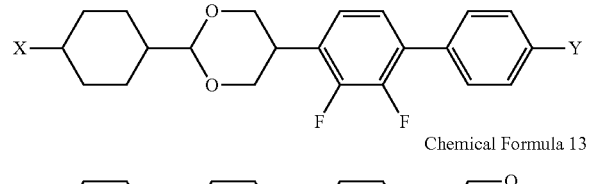

Chemical Formula 13
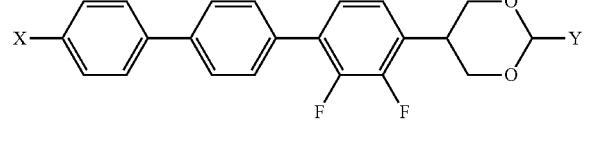

wherein, X and Y are independently a $C_1$-$C_7$ alkyl group.

17. The liquid crystal display of claim 16, wherein the liquid crystal layer has dielectric anisotropy (Δ∈) of about −5.5 to about −2.8.

18. The liquid crystal display of claim 17, wherein the liquid crystal layer further comprises one or more compounds represented by following Chemical Formulas 14 to 16:

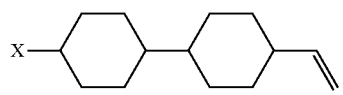
Chemical Formula 14

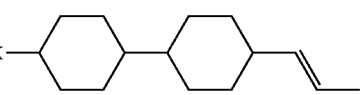
Chemical Formula 15

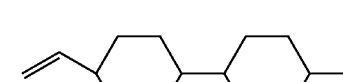
Chemical Formula 16

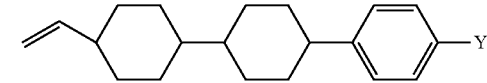

wherein, X and Y are independently a $C_1$-$C_7$ alkyl group.

19. The liquid crystal display of claim 18, wherein the first class liquid crystal compound further comprises one or more compounds represented by following Chemical Formulas 17 to 20:

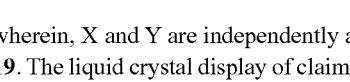
Chemical Formula 17

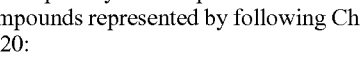
Chemical Formula 18

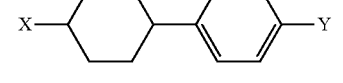
Chemical Formula 19

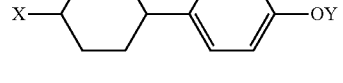
Chemical Formula 20 wherein, X and Y are independently a $C_1$-$C_7$ alkyl group.

20. The liquid crystal display of claim 19, wherein the second class liquid crystal compound further comprises one or more compounds represented by following Chemical Formulas 21 to 26:

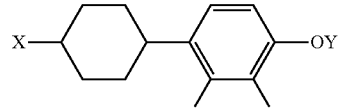
Chemical Formula 21

Chemical Formula 22

-continued

Chemical Formula 23
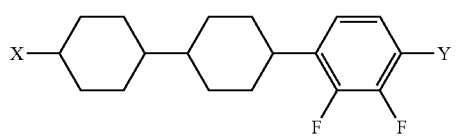

Chemical Formula 24
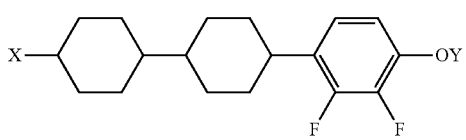

Chemical Formula 25
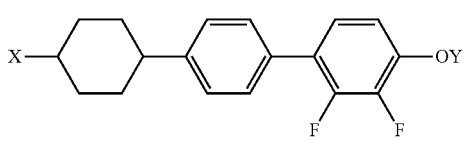

Chemical Formula 26
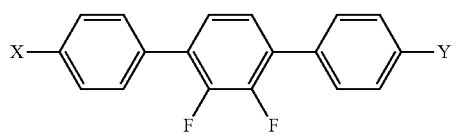

wherein, X and Y are independently a $C_1$-$C_7$ alkyl group.

21. The liquid crystal display of claim 16, wherein the liquid crystal layer further comprises a reactive mesogen.

22. The liquid crystal display of claim 16, wherein the liquid crystal layer has a refractive index (Δn) of about 0.08 to about 0.12.

23. The liquid crystal display of claim 16, wherein the first class liquid crystal compound is present in an amount of about 10 wt % to about 45 wt %, based on a total weight of the liquid crystal layer.

24. The liquid crystal display of claim 16, wherein the second class liquid crystal compound is present in an amount of about 5 wt % to about 15 wt %, based on a total weight of the liquid crystal layer.

25. A liquid crystal display comprising:
a first insulation substrate;
a thin film transistor positioned on the first insulation substrate;
a pixel electrode connected to the thin film transistor;
a common electrode insulated from the pixel electrode and positioned on the first insulation substrate;
a second insulation substrate facing the first insulation substrate; and
a liquid crystal layer positioned between the first insulation substrate and the second insulation substrate,
wherein the liquid crystal layer comprises:
a first class liquid crystal compound and
a second class liquid crystal compound;
wherein the first class liquid crystal compound comprises one or more compounds represented by following Chemical Formulas 1 to 8:

Chemical Formula 1
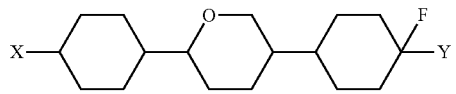

-continued

Chemical Formula 2
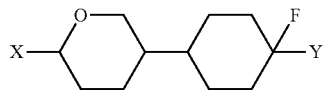

Chemical Formula 3
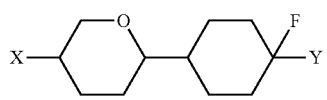

Chemical Formula 4
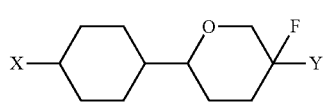

Chemical Formula 5
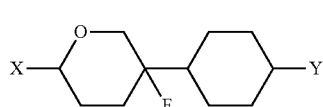

Chemical Formula 6
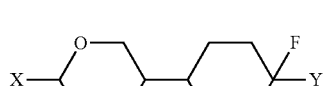

Chemical Formula 7
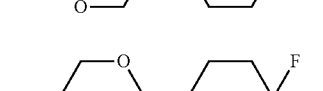

Chemical Formula 8
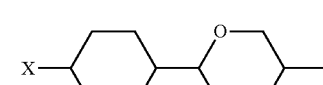

wherein, X and Y are independently a $C_1$-$C_7$ alkyl group.

26. The liquid crystal display of claim 25, wherein the liquid crystal layer has a dielectric anisotropy (Δ∈) of about 5 to about 17, and a refractive index (Δn) of about 0.08 to about 0.15.

27. The liquid crystal display of claim 25, wherein the liquid crystal layer further comprises one or more compounds represented by following Chemical Formulas 27 to 33:

Chemical Formula 27
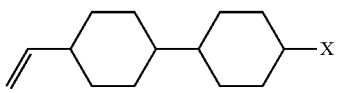

Chemical Formula 28
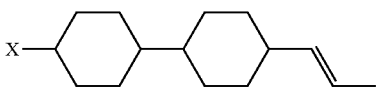

Chemical Formula 29
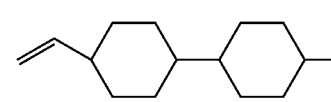

Chemical Formula 30
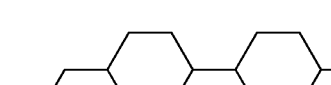

Chemical Formula 31

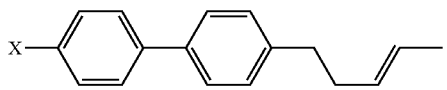

Chemical Formula 32

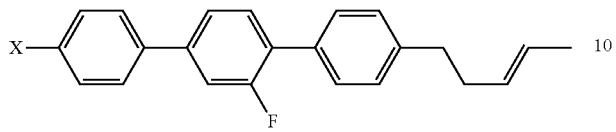

Chemical Formula 33

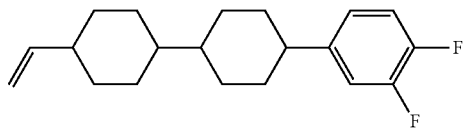

wherein, X and Y are independently a $C_1$-$C_7$ alkyl group.

28. The liquid crystal display of claim 27, wherein the first class liquid crystal compound is present in an amount of about 2 wt % to about 20 wt %, based on a total weight of the liquid crystal layer.

29. The liquid crystal display of claim 28, wherein the first class liquid crystal compound further comprises one or more compounds represented by the following Chemical Formulas 34 to 38:

Chemical Formula 34

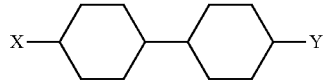

Chemical Formula 34

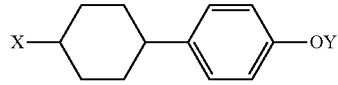

Chemical Formula 36

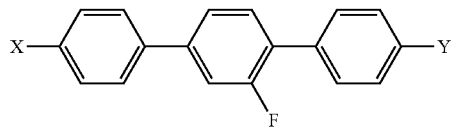

Chemical Formula 37

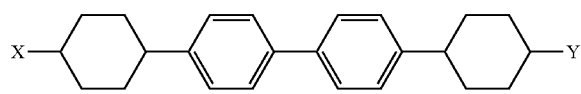

Chemical Formula 38

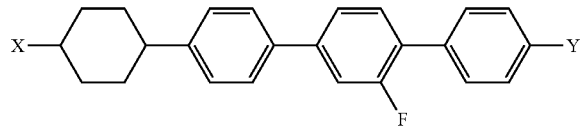

wherein, X and Y are each independently a $C_1$-$C_7$ alkyl group.

30. The liquid crystal display of claim 29, wherein the second class liquid crystal compound further comprises one or more compounds represented by following Chemical Formulas 39 to 49:

Chemical Formula 39

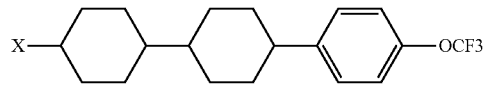

Chemical Formula 40

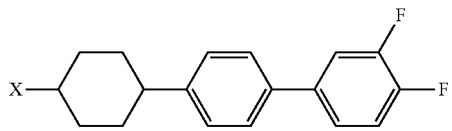

Chemical Formula 41

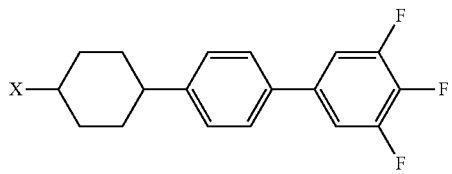

Chemical Formula 42

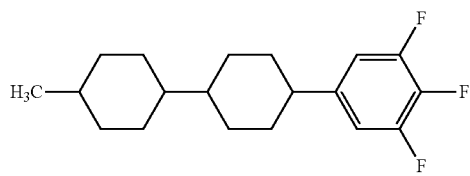

Chemical Formula 43

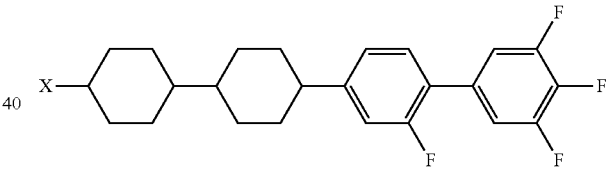

Chemical Formula 44

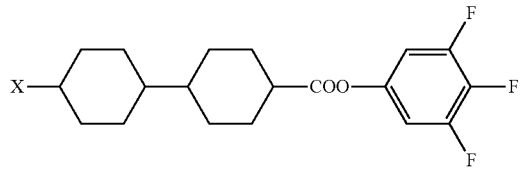

Chemical Formula 45

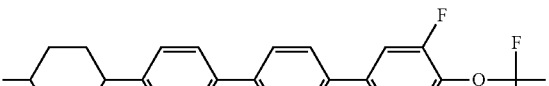

Chemical Formula 46

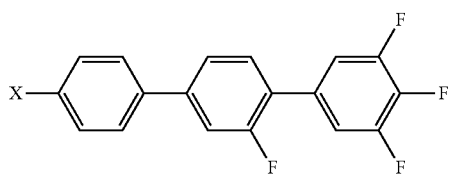

Chemical Formula 47
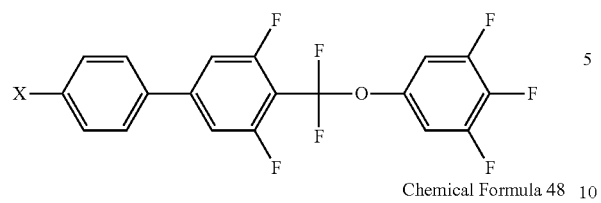
Chemical Formula 48
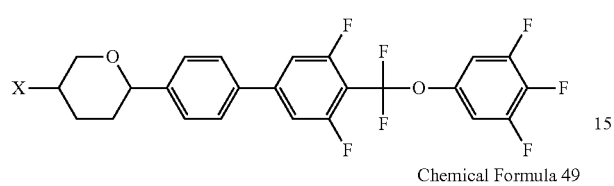
Chemical Formula 49
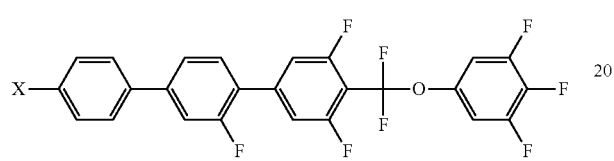
wherein, X and Y are independently a $C_1$-$C_7$ alkyl group.
* * * * *